United States Patent
Chen et al.

(10) Patent No.: US 10,647,128 B2
(45) Date of Patent: May 12, 2020

(54) FLUID LEVEL SENSOR

(71) Applicant: HEWLETT-PACKARD DEVELOPMENT COMPANY, L.P., Houston, TX (US)

(72) Inventors: Chien-Hua Chen, Corvallis, OR (US); Michael W. Cumbie, Corvallis, OR (US); Anthony D. Studer, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/092,652

(22) PCT Filed: Apr. 21, 2016

(86) PCT No.: PCT/US2016/028624
§ 371 (c)(1),
(2) Date: Oct. 10, 2018

(87) PCT Pub. No.: WO2017/184143
PCT Pub. Date: Oct. 26, 2017

(65) Prior Publication Data
US 2019/0168511 A1    Jun. 6, 2019

(51) Int. Cl.
*B41J 2/175*    (2006.01)
*G01F 23/24*    (2006.01)

(52) U.S. Cl.
CPC ........ *B41J 2/17566* (2013.01); *G01F 23/247* (2013.01); *G01F 23/248* (2013.01); *B41J 2002/17579* (2013.01)

(58) Field of Classification Search
CPC ......... B41J 2/17566; B41J 2002/17579; G01F 23/247; G01F 23/248
See application file for complete search history.

(56) References Cited

U.S. PATENT DOCUMENTS 3,922,658 A * 11/1975 Harper ................. G01F 23/247
                                                                340/622
3,964,311 A    6/1976 Holmen
5,142,909 A *  9/1992 Baughman ............ G01F 23/247
                                                                338/38

(Continued)

FOREIGN PATENT DOCUMENTS

WO    WO2015119593 A1    8/2015
WO    WO2015119594 A1    8/2015

OTHER PUBLICATIONS

Chin-Tai, C.; "Ink Tank Having Visible Ink Level and End Leg for Ink Supply System of Printer"; Jan. 1, 1999.

*Primary Examiner* — Julian D Huffman
(74) *Attorney, Agent, or Firm* — Fabian VanCott

(57) ABSTRACT

A method of forming a fluid level sensor includes coupling an array of heating elements and sensors to a first side of a substrate. A second side of the substrate is coupled to a carrier. The method also includes coupling an electrical interface to the carrier and electrically coupling the array to the electrical interface via a conductive wire. The method further includes overmolding the electrical interface, the first side of the substrate, and the conductive wire to form an overmolded fluid level sensor. The carrier may be coupled to the second side of the substrate and the electrical interface via a releasable adhesive and may be removed after overmolding the fluid level sensor.

20 Claims, 14 Drawing Sheets

(56) References Cited

U.S. PATENT DOCUMENTS

| | | | |
|---|---|---|---|
| 5,610,635 A | 3/1997 | Murray et al. | |
| 6,966,222 B2* | 11/2005 | Carlson | G01F 23/22 |
| | | | 347/7 |
| 7,146,854 B2* | 12/2006 | Carlson | G01F 23/22 |
| | | | 73/295 |
| 7,258,483 B2* | 8/2007 | Heldberg | G01F 23/246 |
| | | | 374/110 |
| 7,392,691 B1* | 7/2008 | Yeckley | G01F 23/247 |
| | | | 73/295 |
| 7,523,661 B2* | 4/2009 | Dwyer | G01F 23/247 |
| | | | 73/295 |
| 8,449,055 B2 | 5/2013 | Kura | |
| 8,602,540 B2 | 12/2013 | Kura | |
| 9,091,583 B2* | 7/2015 | Villella | G01F 23/22 |
| 9,400,204 B2* | 7/2016 | Schoenberg | G01F 25/0061 |
| 10,107,667 B2* | 10/2018 | Cumbie | G01F 23/22 |
| 2002/0129650 A1* | 9/2002 | Zimmermann | G01F 15/022 |
| | | | 73/295 |
| 2005/0120791 A1* | 6/2005 | Carlson | G01F 23/22 |
| | | | 73/295 |
| 2005/0126282 A1 | 6/2005 | Maatuk | |
| 2008/0041152 A1* | 2/2008 | Schoenberg | G01F 23/246 |
| | | | 73/295 |
| 2010/0147299 A1 | 6/2010 | Row | |
| 2013/0192352 A1* | 8/2013 | Lanzani | G01F 1/6888 |
| | | | 73/61.76 |
| 2013/0295245 A1* | 11/2013 | Gardner | A47J 37/1266 |
| | | | 426/233 |
| 2014/0260520 A1* | 9/2014 | Schoenberg | G01F 25/0061 |
| | | | 73/1.73 |
| 2019/0111694 A1* | 4/2019 | Cumbie | B41J 2/1753 |

* cited by examiner

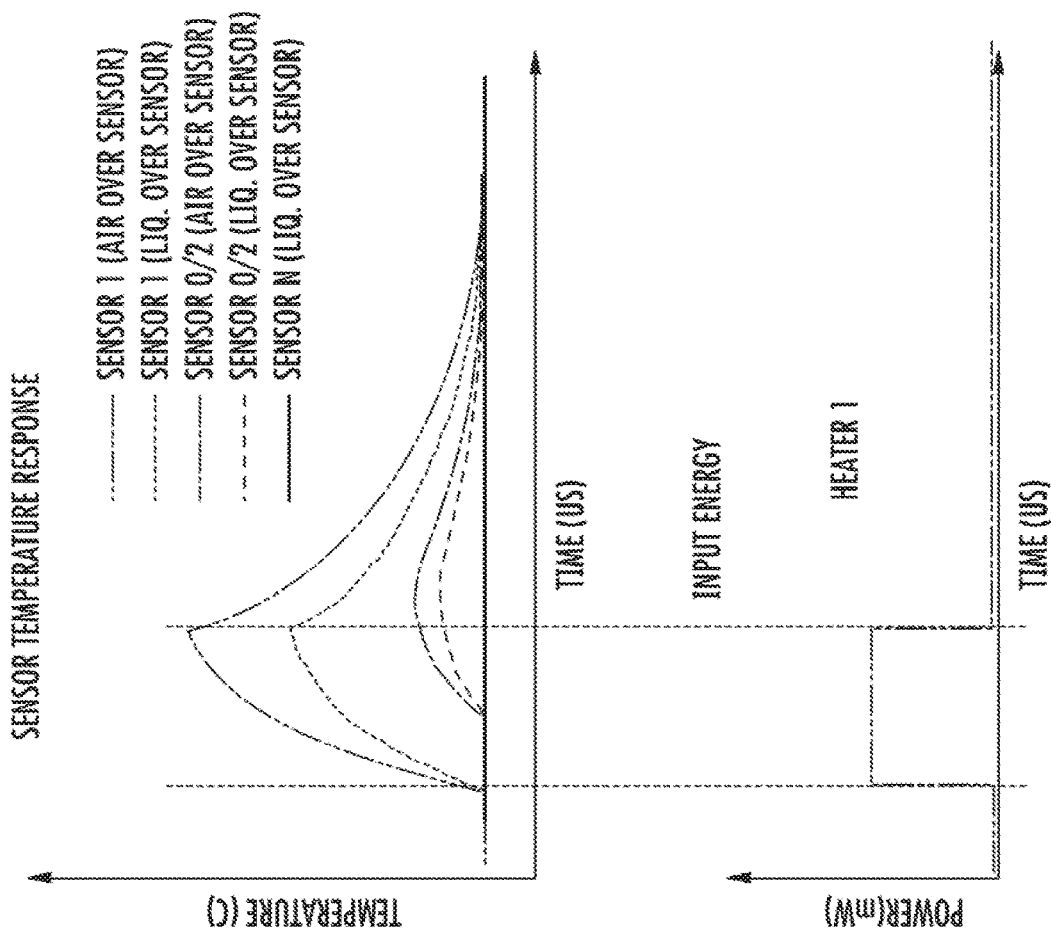
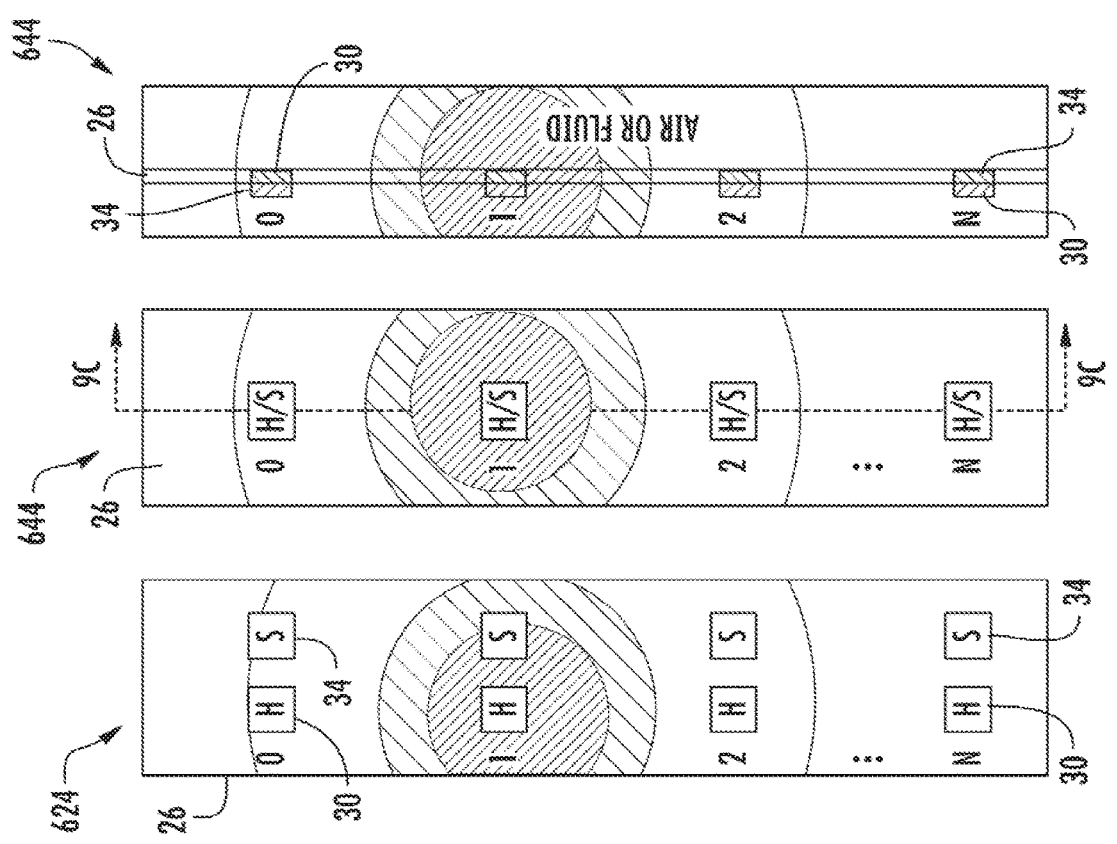

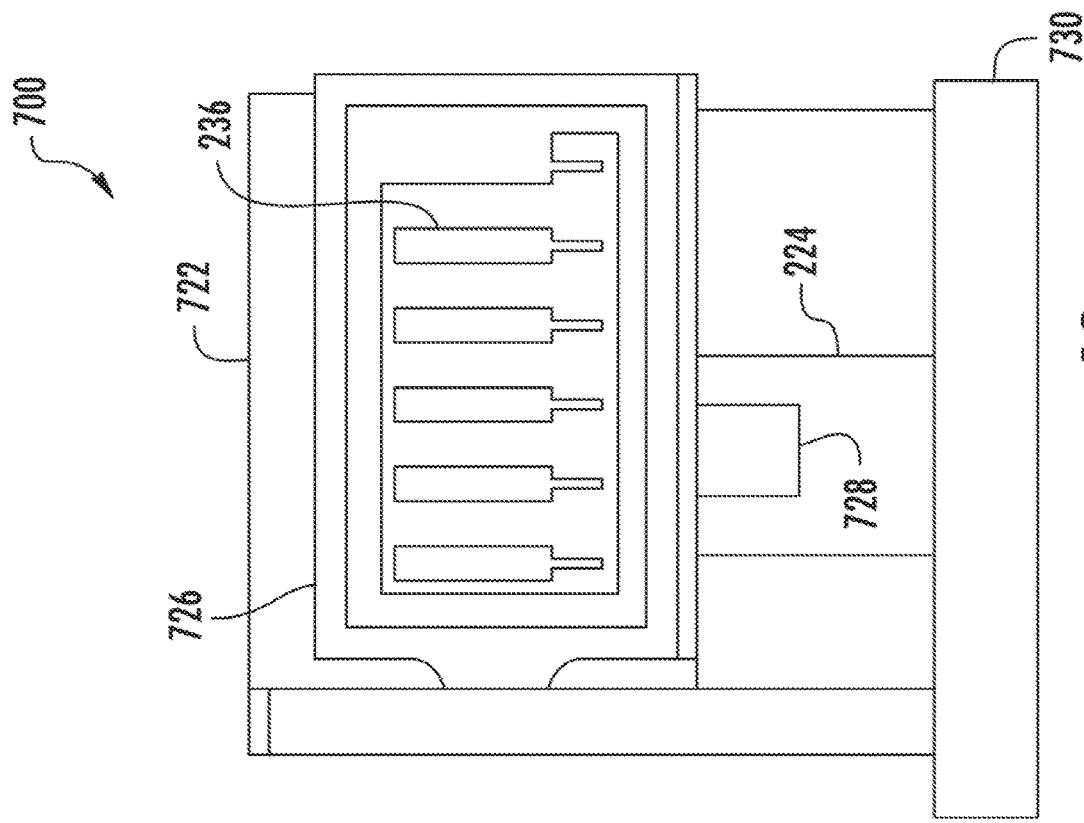
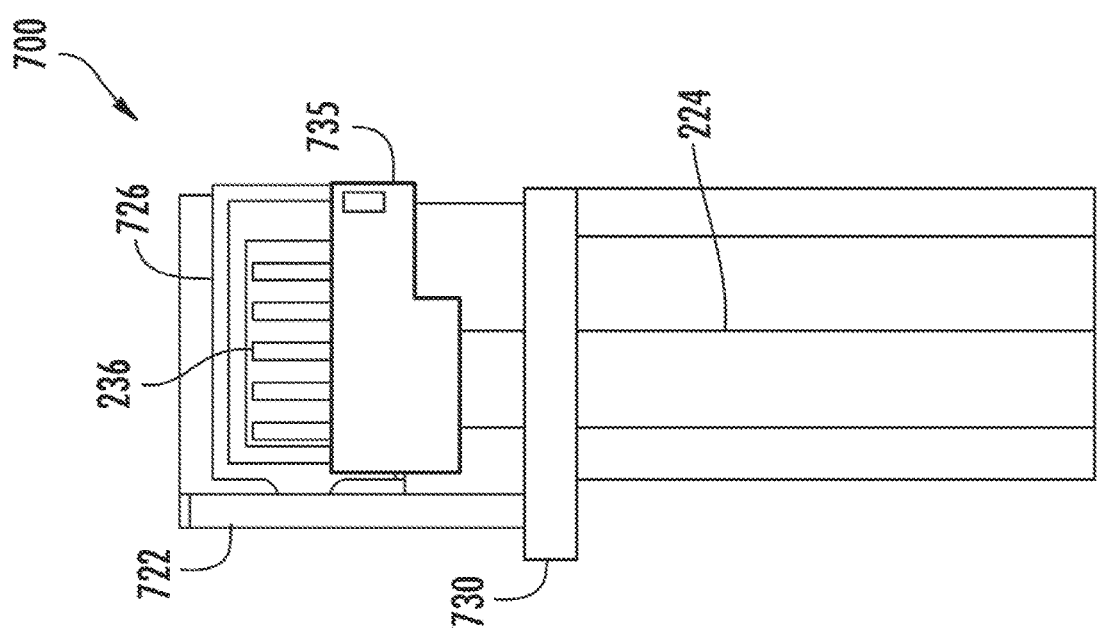

FLUID LEVEL SENSOR

BACKGROUND

Printing devices eject printable fluid onto print media in order to form an image or a structure on the print media. The printable fluid may be stored in a reservoir or other volume from which a printing device draws the printable fluid. Over time, the level or amount of printable fluid within the reservoir is depleted.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIG. 9A is a fragmentary front view of the fluid level sensor of FIG. 6, illustrating an example heat spike resulting from the pulsing of a heater, according to one example of the principles described herein.

FIG. 9B is a fragmentary front view of another example fluid level sensor, illustrating an example heat spike resulting from the pulsing of a heater, according to one example of the principles described herein.

FIG. 9C is a sectional view of the example fluid level sensor of FIG. 9B, illustrating the example heat spike resulting from the pulsing of the heater, according to one example of the principles described herein.

FIG. 10 is a graph illustrating an example of different sensed temperature responses over time to a heater impulse, according to one example of the principles described herein.

FIG. 11 is a diagram of another example fluid level sensor, according to one example of the principles described herein.

FIG. 12 is an enlarged view of a portion of the example fluid level sensor of FIG. 11, according to one example of the principles described herein.

Throughout the drawings, identical reference numbers designate similar, but not necessarily identical, elements.

DETAILED DESCRIPTION

Figure 1A:
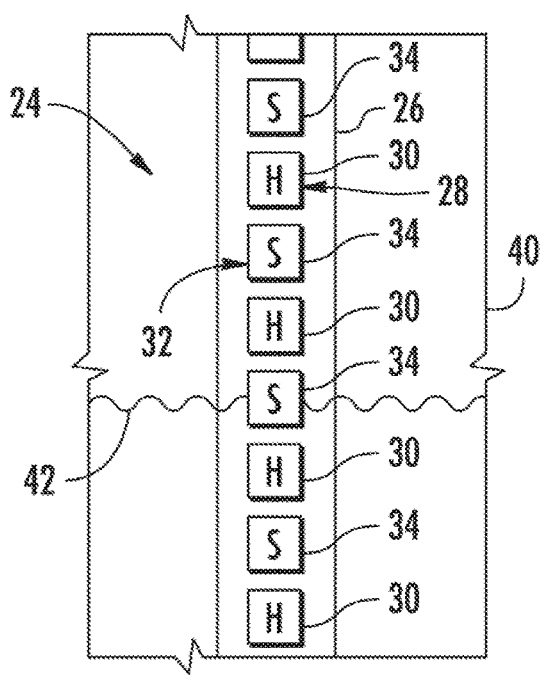
FIG. 1A is a diagram of a portion of an example liquid interface for an example fluid level sensor, according to one example of the principles described herein.

As mentioned above, over time, the level or amount of printable fluid within the reservoir is depleted as the printing device utilizes the printable fluid. A number of devices may be used to sense and determine the level or amount of printable fluid within the reservoir of printable fluid. In some examples, the devices used to sense and determine the amount of printable fluid within the reservoir may be complex and expensive to manufacture.

False printable fluid levels or inaccurate readouts causes consumers of printable fluid devices to be dissatisfied with such a product. More reliable and accurate fluid level sensors may cause a consumer base to have a better user experience.

Examples described herein provide a method of forming a fluid level sensor. The method includes coupling an array of heating elements and sensors to a first side of a substrate. A second side of the substrate is coupled to a carrier. The method also includes coupling an electrical interface to the carrier and electrically coupling the array to the electrical interface via a conductive wire, the method further includes overmolding the electrical interface, the first side of the substrate, and the conductive wire to form an overmolded fluid level sensor.

Coupling the array of heating elements and the sensors to the first side of a substrate includes coupling the heating elements to the first side of a substrate and coupling the sensors to the first side of the substrate juxtaposition to the heating elements. In one example, the overmold is an epoxy molding compound (EMC).

In one example, the method includes coupling the overmolded fluid level sensor to a container. The overmolded fluid level sensor protrudes into the container. Further, the method includes sealing the container with respect to an exterior of the container and the overmolded fluid level sensor.

In one example, coupling the substrate and the electrical interface to the carrier includes coupling the substrate and the electrical interface to the carrier via a releasable adhesive. Further, in one example, the substrate comprises silicon. The method may further include thinning the substrate to approximately 100 micrometers (μm) or less. Still further, the method includes removing the carrier. Removing the carrier includes removing the carrier via a releasable adhesive used to couple the carrier to the second side of the substrate and the electrical interface.

Examples described herein also provide a fluid level sensor. The fluid level sensor includes a substrate, an array of heating elements and sensors coupled to a first side of the substrate, an electrical interface, a wire bond electronically coupling the array to the electrical interface, and an overmold. The overmold covers the electrical interface, the first side of the substrate, and the conductive wire to form an overmolded fluid level sensor. In one example, the substrate is approximately 100 micrometers (μm) thick or less. Further, in one example, the overmold is an epoxy molding compound (EMC).

Examples described herein further provide a printable fluid reservoir including a fluid level sensor. The fluid level sensor includes a substrate, an array of heating elements and sensors coupled to a first side of the substrate, and an overmold. The overmold covers the first side of the substrate to form an overmolded fluid level sensor. The printable fluid reservoir also includes an electrical interface, and a wire bond electronically coupling the array to the electrical interface. The overmold covers the electrical interface, the first side of the substrate, and the wire bond to form the overmolded fluid level sensor. The printable fluid reservoir further includes a seal interposed between the overmolded fluid level sensor and the printable fluid reservoir to seal the printable fluid reservoir with respect to an exterior of the printable fluid reservoir and the overmolded fluid level sensor In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

This disclosure describes various example liquid level sensing liquid interfaces that are less expensive to manufacture. As will be described hereafter, in some examples, the disclosed liquid level sensing liquid interfaces facilitate the use of materials including a wide range of temperature coefficient of resistance. In some examples, the disclosed liquid level sensing liquid interfaces are well adapted for sensing the level of otherwise corrosive liquids without using generally more expensive corrosive resistant materials.

Figure 1B:
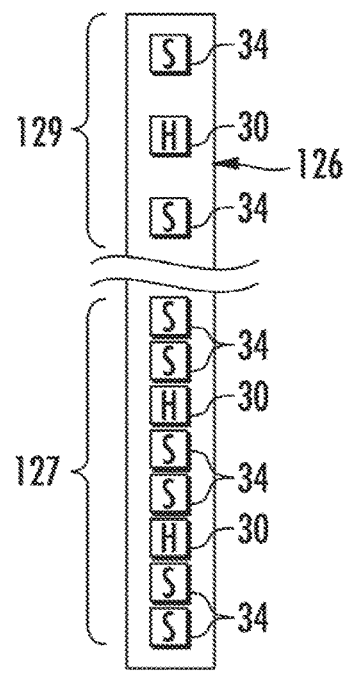
FIG. 1B is a diagram of portions of another example liquid interface for an example fluid level sensor, according to one example of the principles described herein.

FIG. 1 illustrates an example liquid level sensing interface (24) for a fluid level sensor. Liquid interface (24) interacts with liquid within a volume (40) and outputs signals that indicate the current level of liquid within the volume (40). Such signals are processed to determine the level of liquid within the volume (40). Liquid interface (24) facilitates the detection of the level of liquid within the volume (40) in a low-cost manner.

As schematically shown by FIG. 1, liquid interface (24) includes strip (26), a series (28) of heaters (30) and a series (32) of sensors (34). The strip (26) includes an elongated strip that is to be extended into volume (40) containing the liquid (42). The strip (26) supports heaters (30) and sensors (34) such that a subset of the heaters (30) and the sensors (34) are submersed within the liquid (42), when the liquid (42) is present.

In one example, the strip (26) is supported from the top or from the bottom such that those portions of the strip (26), and their supported heaters (30) and sensors (34), submersed within the liquid (42), are completely surrounded on all sides by the liquid (42). In another example, the strip (26) is supported along a side of the volume (40) such that a face of the strip (26) adjacent the side of the volume (40) is not opposed by the liquid (42). In one example, the strip (26) includes an elongated rectangular, substantially flat strip. In another example the strip (26) includes a strip including a different polygon cross-section or a circular or oval cross-section.

The heaters (30) include individual heating elements spaced along a length of the strip (26). Each of the heaters (30) is sufficiently close to a sensor (34) such that the heat emitted by the individual heater may be sensed by the associated sensor (34). In one example, each heater (30) is independently actuatable to emit heat independent of other heaters (30). In one example, each heater (30) includes an electrical resistor. In one example, each heater (30) is emits a heat pulse for a duration of at least 10 μs with a power of at least 10 mW.

In the example illustrated, the heaters (30) are employed to emit heat and do not serve as temperature sensors. As a result, each of the heaters (30) may be constructed from a wide variety of electrically resistive materials including a wide range of temperature coefficient of resistance. A resistor may be characterized by its temperature coefficient of resistance, or TCR. The TCR is the resistor's change in resistance as a function of the ambient temperature. TCR may be expressed in ppm/° C., which stands for parts per million per centigrade degree. The temperature coefficient of resistance is calculated as follows:

temperature coefficient of a resistor: $TCR = (R2-R1)e-6R1*(T2-T1)$, where TCR is in ppm/° C., R1 is in ohms at room temperature, R2 is resistance at operating temperature in ohms, T1 is the room temperature in ° C. and T2 is the operating temperature in ° C.

Because the heaters (30) are separate and distinct from the temperature sensors (34), a wide variety of thin-film material choices are available in wafer fabrication processes for forming the heaters (30). In one example, each of the heaters (30) has a relatively high heat dissipation per area, high temperature stability (TCR<1000 ppm/° C.), and the intimate coupling of heat generation to the surrounding medium and heat sensor. Suitable materials can be refractory metals and their respective alloys such as tantalum, and its alloys, and tungsten, and its alloys, to name a few; however, other heat dissipation devices like doped silicon or polysilicon may also be used.

The sensors (34) include individual sensing elements spaced along the length of the strip (26). Each of the sensors (34) is sufficiently close to a corresponding heater (30) such that the sensor (34) may detect or respond to the transfer of heat from the associated or corresponding heater (30). Each of the sensors (34) outputs a signal which indicates or reflects the amount of heat transmitted to the particular sensor (34) following and corresponding to a pulse of heat from the associated heater. The amount of heat transmitted by the associated heater will vary depending upon the medium through which the heat was transmitted prior to reaching the sensor (34). Liquid (42) has a higher heat capacity than air (41). Thus, the liquid (42) will reduce the temperature detected by sensor (34) differently with respect to the air (41). As a result, the differences between signals from sensors (34) indicate the level of the liquid (42) within the volume (40).

In one example, each of the sensors (34) includes a diode which has a characteristic temperature response. For example, in one example, each of the sensors (34) includes a P-N junction diode. In other examples, other diodes may be employed or other temperature sensors may be employed.

In the example illustrated, the heaters (30) and the sensors (34) are supported by the strip (26) so as to be interdigitated or interleaved amongst one another along the length of the strip (26). For purposes of this disclosure, the term "support" or "supported by" with respect to heaters and/or sensors and a strip means that the heaters and/or sensors are carried by the strip such that the strip, heaters, and sensors form a single connected unit. Such heaters and sensors may be supported on the outside or within and interior of the strip. For purposes of this disclosure, the term "interdigitated" or "interleaved" means that two items alternate with respect to one another. For example, interdigitated heaters and sensors may include a first heater, followed by a first sensor, followed by a second heater, followed by a second sensor and so on.

In one example, an individual heater (30) may emit pulses of heat that are to be sensed by multiple sensors (34) proximate to the individual heater (30). In one example, each sensor (34) is spaced no greater than 20 μm from an individual heater (30). In one example, the sensors (34) have a minimum one-dimensional density along strip (24) of at least 100 sensors (34) per inch (at least 40 sensors (34) per centimeter). The one dimensional density includes a number of sensors per unit measure in a direction along the length of the strip (26), the dimension of the strip (26) extending to different depths, defining the depth or liquid level sensing resolution of the liquid interface (24). In other examples, the sensors (34) have other one dimensional densities along the strip (24). For example, the sensors (34) have a one-dimensional density along the strip (26) of at least 10 sensors (34) per inch. In other examples, the sensors (34) may have a one-dimensional density along the strip (26) on the order of 1000 sensors per inch (400 sensors (34) per centimeter) or greater.

In some examples, the vertical density or number of sensors per vertical centimeter or inch may vary along the vertical or longitudinal length of the strip (26). FIG. 1A illustrates an example sensor strip (126) including a varying density of sensors (34) along its major dimension or launching a length. In the example illustrated, the sensor strip (126) has greater density of sensors (34) in those regions along the vertical height or depth may benefit more from a greater degree of depth resolution. In the example illustrated, the sensor strip (126) has a lower portion (127) including a first density of sensors (34) and an upper portion (129) including a second density of sensors (34), the second density being less than the first density. In such an example, the sensor strip (126) provides a higher degree of accuracy or resolution as the level of the liquid within the volume approaches an empty state. In one example, the lower portion (127) has a density of at least (40) sensors (34) per centimeter while upper portion (129) has a density of less than 10 sensors per centimeter, and in one example, 4 sensors (34) per centimeter. In yet other examples, an upper portion or a middle portion of the sensor strip (126) may alternatively have a greater density of sensors as compared to other portions of the sensor strip (126).

Each of the heaters (30) and each of the sensors (34) are selectively actuatable under the control of a controller. In one example, the controller is part of or carried by the strip (26). In another example, the controller includes a remote controller electrically connected to the heaters (30) on the strip (26). In one example, the interface (24) includes a separate component from the controller, facilitating replacement of the interface (24) or facilitating the control of multiple interfaces (24) by a separate controller.

Figure 2:
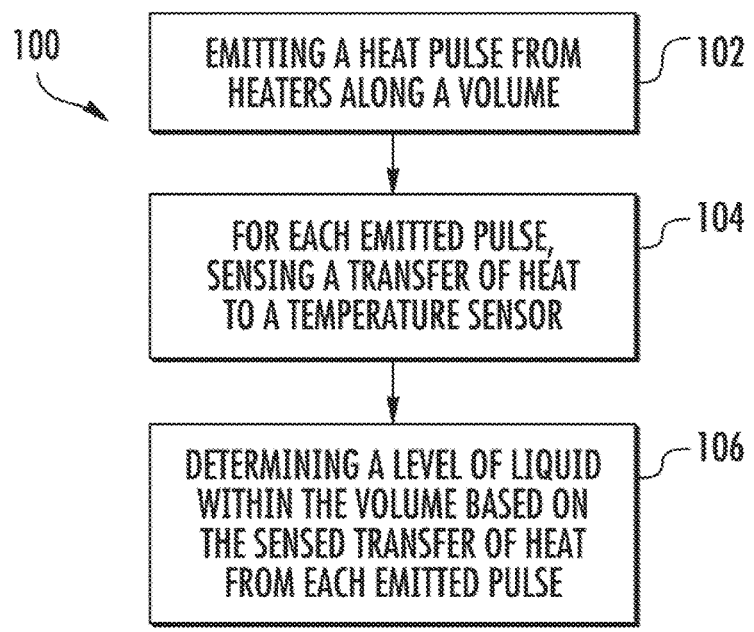
FIG. 2 is a flow diagram of an example method for determining a level of liquid using the fluid level sensor of the FIG. 1, according to one example of the principles described herein.

FIG. 2 is a flow diagram of an example method (100) that may be carried out using a liquid interface, such as the liquid interface (24), to sense and determine the level of a liquid within a volume. As indicated by block 102, control signals are sent to heaters (30) causing a subset of the heaters (30) or each of the heaters (30) to turn on and off so as to emit a heat pulse. In one example, control signals are sent to the heaters (30) such that the heaters (30) are sequentially actuated or turned on and off (pulsed) to sequentially emit pulses of heat. In one example, the heaters (30) are sequentially turned on and off, for example, in order from top to bottom along the strip (26) or from bottom to top along the strip (26).

In another example, the heaters (30) are actuated based upon a search algorithm, wherein the controller identifies which of the heaters (30) should be initially pulsed in an effort to reduce the total time or the total number of heaters (30) that are pulsed to determine the level of liquid (42) within volume (40). In one example, the identification of what heaters (30) are initially pulsed is based upon historical data. For example, in one example, the controller consults a memory to obtain data regarding the last sensed level of liquid (42) within the volume (40) and pulses those heaters (30) most proximate to the last sensed level of the liquid (42) before pulsing other heaters (30) more distant from the last sensed level of the liquid (42).

In another example, the controller predicts the current level of the liquid (42) within the volume (40) based upon the obtained last sensed level of the liquid (42) and pulses those heaters (30) proximate to the predicted current level of the liquid (42) within the volume (40) pulsing other heaters (30) more distant from the predicted current level of the liquid (42). In one example, the predicted current level of the liquid (42) is based upon the last sensed level of the liquid (42) and a lapse of time since the last sensing of the level of the liquid (42). In another example, the predicted current level of the liquid (42) is based upon the last sensed level of the liquid (42) and data indicating the consumption or withdrawal of the liquid (42) from the volume (40). For example, in circumstances where the liquid interface (42) is sensing the volume (40) of an ink in an ink supply, the predicted current level of liquid (42) may be based upon a last sensed level of the liquid (42) and data such as the number of pages printed using the ink or the like.

In yet another example, the heaters (30) may be sequentially pulsed, wherein the heaters (30) proximate to a center of the depth range of volume (40) are initially pulsed and wherein the other heaters (30) are pulsed in the order based upon their distance from the center of the depth range of volume (40). In yet another example, subsets of heaters (30) are concurrently pulsed. For example, a first heater and a second heater may be concurrently pulsed where the first heater and the second heater are sufficiently spaced from one another along strip (26) such that the heat emitted by the first heater is not transmitted or does not reach the sensor intended to sense transmission of heat from the second heater. Concurrently pulsing heaters (30) may reduce the total time for determining the level of the liquid (42) within the volume (40).

In one example, each heat pulse has a duration of at least 10 μs and has a power of at least 10 mW. In one example, each heat pulse has a duration of between 1 and 100 μs and up to a millisecond. In one example, each heat pulse has a power of at least 10 mW and up to and including 10 W.

As indicated by block 104 in FIG. 2, for each emitted pulse, an associated sensor (34) senses the transfer of heat from the associated heater to the associated sensor (34). In one example, each sensor (34) is actuated, turned on or polled following a predetermined period of time after the pulse of heat from the associated heater. The period of time may be based upon the beginning of the pulse, the end of the pulse or some other time value related to the timing of the pulse. In one example, each sensor (34) senses heat transmitted from the associated heater (30) beginning at least 10 μs following the end of the heat pulse from the associated heater (30). In one example, each sensor (34) senses heat transmitted from the associated heater (30) beginning at 1000 μs following the end of the heat pulse from the associated heater (30). In another example, sensor (34) initiates the sensing of heat after the end of the heat pulse from the associated heater following a period of time equal to a duration of the heat pulse, wherein such sensing occurs for a period of time of between two to three times the duration of the heat pulse. In yet other examples, the time delay between the heat pulse and the sensing of heat by the associated sensor (34) may have other values.

As indicated by block 106 in FIG. 2, the controller or another controller determines a level of the liquid (42) within the volume (40) based upon the sensed transfer of heat from each emitted pulse. For example, the liquid (42) has a higher heat capacity than air (41). Thus, the liquid (34) may reduce the temperature detected by sensor (34) differently with respect to the air (41). If the level of the liquid (42) within the volume (40) is such that liquid is extending between a particular heater (30) and its associated sensor (34), heat transfer from the particular heater (32) to the associated sensor (34) will be less as compared to circumstances where air (41) is extending between the particular heater (30) and its associated sensor (34). Based upon the amount of heat sensed by the associated sensor (34) following the emission of the heat pulse by the associated heater (30), the controller determines whether air or liquid is extending between the particular heater (30) and the associated sensor. Using this determination and the known location of the heater (30) and/or sensor (34) along the strip (26) and the relative positioning of the strip (26) with respect to the floor of the volume (40), the controller determines the level of the liquid (42) within the volume (40). Based upon the determined level of the liquid (42) within the volume (40) and the characteristics of the volume (40), the controller is further able to determine the actual volume or amount of liquid remaining within the volume (40).

In one example, the controller determines the level of liquid within the volume (40) by consulting a lookup table stored in a memory, wherein the lookup table associates different signals from the sensors (34) with different levels of liquid within the volume (40). In yet another example, the controller determines the level of the liquid (42) within the volume (40) by utilizing signals from the sensors (34) as input to an algorithm or formula.

In some examples, method 100 and the liquid interface (24) may be used to not only determine an uppermost level or top surface of the liquid (42) within the volume (40), but also to determine different levels of different liquids concurrently residing in the volume (40). For example, due to different densities or other properties, different liquids may layer upon one another while concurrently residing in a single volume (40). Each of such different liquids may have a different heat transfer characteristic. In such an application, method 100 and liquid interface (24) may be used to identify where the layer of a first liquid ends within volume (40) and where the layer of a second different liquid, underlying or overlying the first liquid, begins.

In one example, the determined level (or levels) of liquid within the volume (40) and/or the determined volume or amount of liquid within volume (40) is output through a display or audible device. In yet other examples, the determined level of liquid or the volume of liquid is used as a basis for triggering an alert, warning or the like to user. In some examples, the determined level of liquid or volume of liquid is used to trigger the automatic reordering of replenishment liquid or the closing of a valve to stop the inflow of liquid into the volume (40). For example, in printers, the determined level of liquid within volume (40) may automatically trigger reordering of the replacement ink cartridge or replacement ink supply.

Figure 3:
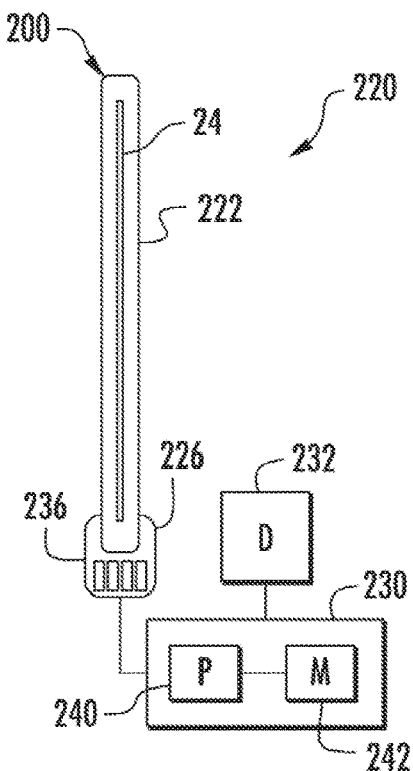
FIG. 3 is a diagram of an example liquid level sensing system, according to one example of the principles described herein.

FIG. 3 illustrates an example liquid level sensing system (220). Liquid level sensing system (220) includes a carrier (222), the liquid interface (24) described above, an electoral interconnect (226), a controller (230) and a display (232). The carrier (222) includes a structure that supports the strip (26). In one example, the carrier (222) includes a strip (26) formed from, or that includes, a polymer, glass or other material. In one example, the carrier (222) has embedded electrical traces or conductors. For example, the carrier (222) includes composite material composed of woven fiberglass cloth with an epoxy resin binder. In one example, the carrier (222) includes a glass-reinforced epoxy laminate sheet, tube, rod, or printed circuit board.

Liquid interface (24), described above, extends along a length of the carrier (222). In one example, the liquid interface (24) is glued, bonded or otherwise affixed to the carrier (222). In some examples, depending upon the thickness and strength of the strip (26), the carrier (222) may be omitted.

The electrical interconnect (226) includes an interface by which signals from the sensors (34) of interface (24) as depicted in FIG. 1 are transmitted to the controller (230). In one example, the electrical interconnect (226) includes electrical contact pads (236). In other examples, the electrical interconnect (226) may have other forms. The electrical interconnect (226), the carrier (222) and the strip (24), collectively, form a fluid level sensor (200) that may be incorporated into and fixed as part of a liquid container volume or may be a separate portable sensing device which may be temporarily manually inserted into different liquid containers or volumes.

The controller (230) includes a processing unit (240) and associated non-transient computer-readable medium or memory (242). In one example, the controller (230) is separate from fluid level sensor (200). In other examples, controller (230) is incorporated as part of the sensor (200). Processing unit (240) files instructions contained in memory (242). For purposes of this application, the term "processing unit" shall mean a presently developed or future developed processing unit that executes sequences of instructions contained in a memory. Execution of the sequences of instructions causes the processing unit to generate control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, the controller (230) may be embodied as part of at least one application-specific integrated circuits (ASICs). Unless otherwise specifically noted, the controller (230) is not limited to any specific combination of hardware circuitry and software, nor to any particular source for the instructions executed by the processing unit.

The processing unit (240), following instructions contained in the memory (242), carries out the method (100) shown and described above with respect to FIG. 2. The processor (240), following instructions provided in the memory (242), selectively pulses the heaters (30). The processor (240), following instructions provided in the memory (242), obtains data signals from the sensors (34), or in the data signals indicate dissipation of heat from the pulses and the transfer of heat to the sensors (34). Processor (240), following instructions provided in memory (242), determines a level of liquid (42) within the volume (40) based upon the signals from the sensors (34). As noted above, in some examples, the controller (230) may additionally determine an amount or volume of liquid (42) using characteristics of the volume (40) or chamber containing the liquid (42).

In one example, the display (232) receives signals from the controller (230), and presents visible data based upon the determined level of liquid (42) and/or determined volume or amount of liquid (42) within the volume (40). In one example, display (232) presents an icon or other graphic depicting a percentage of the volume (40) that is filled with the liquid (42). In another example, the display (232) presents an alphanumeric indication of the level of liquid (42) or percent of the volume (40) that is filled with the liquid (42) or that has been emptied of the liquid (42). In yet another example, the display (232) presents an alert or "acceptable" status based on the determined level of the liquid (42) within the volume (40). In yet other examples, the display (232) may be omitted, wherein the determined level of liquid within the volume is used to automatically trigger an event such as the reordering of replenishment liquid, the actuation of a valve to add a liquid to the volume or the actuation of the valve to terminate the ongoing addition of liquid (42) to the volume (40).

Figure 4:
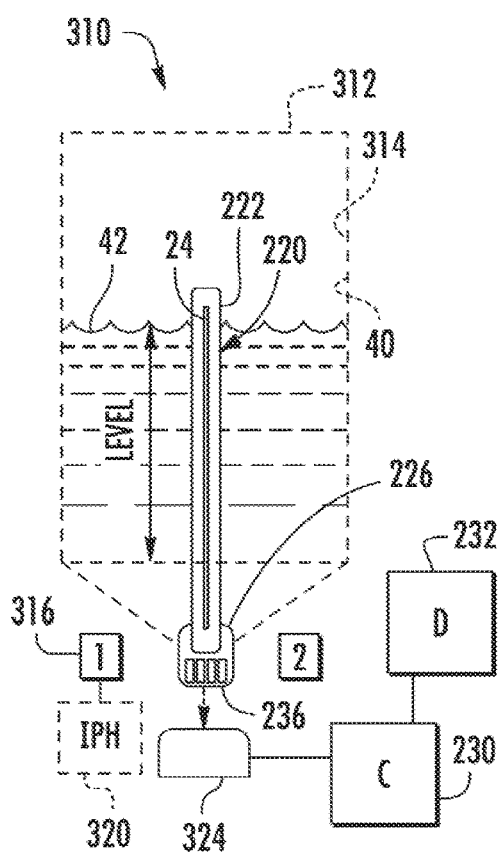
FIG. 4 is a diagram of an example liquid supply system including the liquid level sensing system of FIG. 3, according to one example of the principles described herein.

FIG. 4 is a sectional view illustrating a liquid level sensing system (220) incorporated as part of a liquid supply system (310). The liquid supply system (310) includes a liquid container (312), a chamber (314) and a fluid or liquid ports (316). The container (312) defines the chamber (314). The chamber (314) forms an example volume (40) in which the liquid (42) is contained. As shown by FIG. 4, the carrier (222) and the liquid interface (24) project into the chamber (314) from a bottom side of the chamber (314), facilitating liquid level determinations as the chamber (314) nears a state of being completely empty. In other examples, the carrier (222) of the liquid interface (24) may alternatively be suspended from a top of the chamber (314).

The liquid ports (316) include liquid passes by which liquid from within the chamber (314) is delivered and directed to an external recipient. In one example, the liquid ports (316) include a valve or other mechanism facilitating selective discharge of liquid from the chamber (314). In one example, the liquid supply system (310) includes an off-axis ink supply for a printing system. In another example, the liquid supply system (310) additionally includes a print head (320) which is fluidly coupled to the chamber (314) to receive the liquid (42) from the chamber (314) through the liquid interface (316). In one example, the liquid supply system (310), including the print head (320), may form a print cartridge. For purposes of this disclosure, the term "fluidly coupled" means that two or more fluid transmitting volumes are connected directly to one another or are connected to one another by intermediate volumes or spaces such that fluid may flow from one volume into the other volume.

In the example illustrated in FIG. 4, communication between the controller (230), which is remote or separate from liquid supply system (310), is facilitated via a wiring connector (324) such as a universal serial bus connector or other type of connector. The controller (230) and the display (232) operate as described above.

Figure 5:
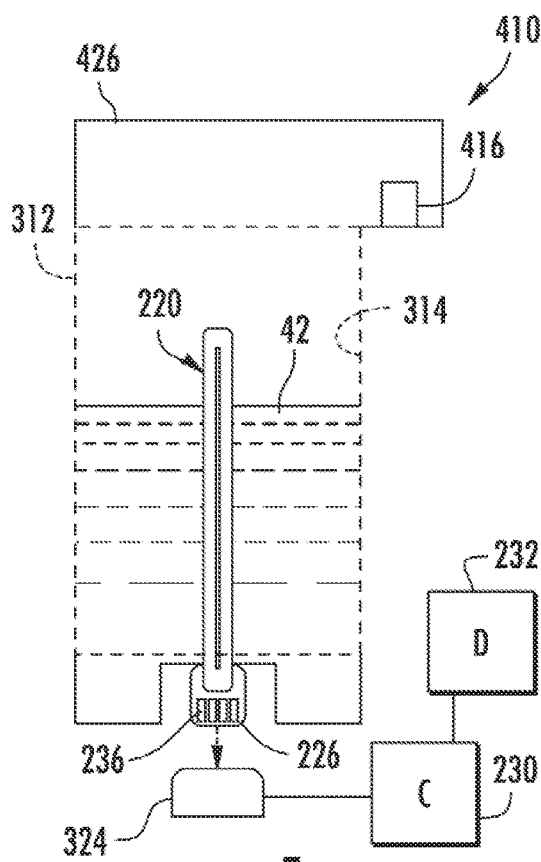
FIG. 5 diagram of another example liquid supply system including the liquid level sensing system of FIG. 3, according to one example of the principles described herein.

FIG. 5 is a sectional view illustrating a liquid supply system (410); another example of the liquid supply system (310). The liquid supply system (410) is similar to the liquid supply system (310) except that the liquid supply system (410) includes a liquid port (416) in place of the liquid port (316). The liquid port (416) is similar to the interface of the liquid port (316) except that the liquid port (416) is provided in a cap (426) above the chamber (314) of the container (312). Those remaining components of system (410) which correspond to components of system (310) are numbered similarly.

Figure 6:
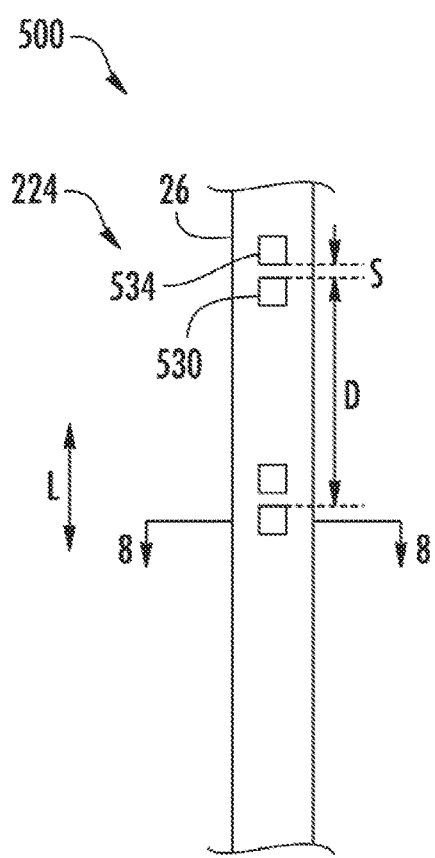
FIG. 6 is a diagram of a portion of another example liquid interface of a fluid level sensor, according to one example of the principles described herein.
Figure 7:
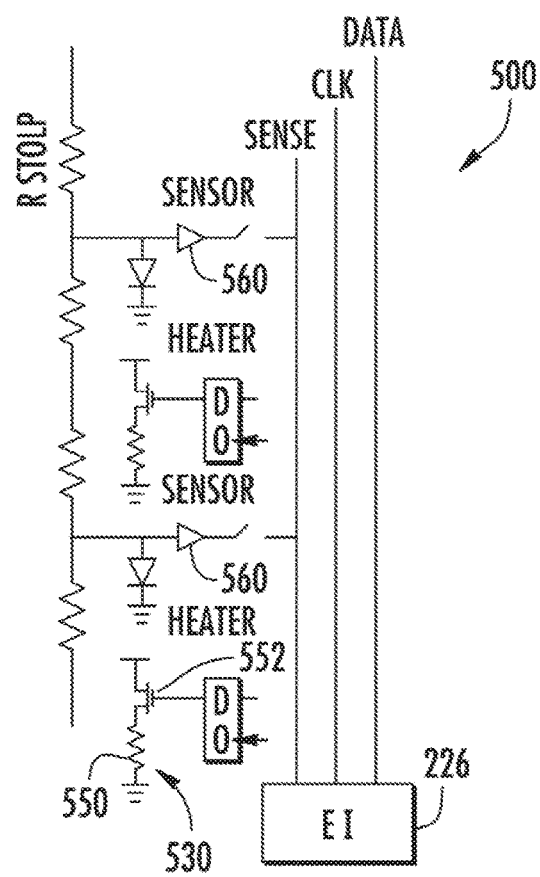
FIG. 7 is an example circuit diagram of the fluid level sensor of FIG. 6, according to one example of the principles described herein.
Figure 8:
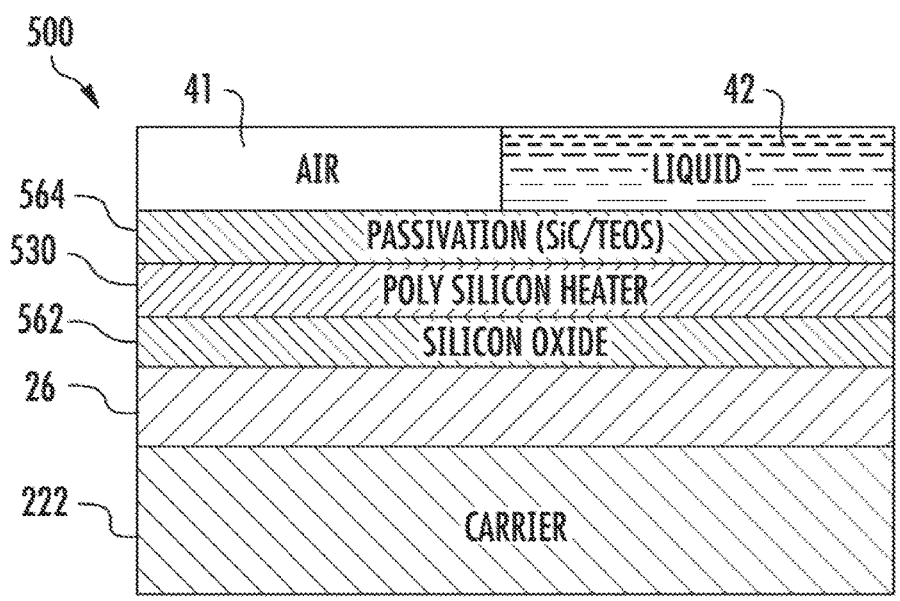
FIG. 8 is a sectional view of the example liquid interface of FIG. 6, according to one example of the principles described herein.

FIGS. 6-8 illustrate a fluid level sensor (500); another example of the fluid level sensor (200) of FIG. 2. FIG. 6 is a diagram illustrating a portion of the liquid interface (224). FIG. 7 is a circuit diagram of a sensor (500). FIG. 8 is a sectional view through a liquid interface (224) of FIG. 6 taken along lines 8-8. As shown by FIG. 6, the liquid interface (224) is similar to the liquid interface (24) described above in connection with FIG. 1 in that the liquid interface (224) includes a strip (26) which supports a series of heaters (530) and a series of temperature sensors (534). In the example illustrated, the heaters (530) and the temperature sensors (534) are interdigitated or interleaved along the length (L) of the strip (26). The length (L) is the major dimension of the strip (26) that extends across different depths when the sensor (500) is being used. In the example illustrated, each sensor (534) is spaced from its associated or corresponding heater (530) by a spacing distance (S), as measured in a direction along the length (L), of less than or equal to 20 μm and nominally 10 μm. In the example illustrated, the sensors (534) and their associated heaters (530) are arranged in pairs, wherein the heaters (530) of adjacent pairs are separated from one another by a distance (D), as measured in a direction along the length (L), of at least 25 μm to reduce thermal cross talk between consecutive heaters. In one example, consecutive heaters (530) are separated from one another by a distance (D) of between 25 μm and 2500 μm, and nominally 100 μm.

As depicted in FIG. 7, each heater (530) includes an electrical resistor (550) which may selectively turn on and off through the selective actuation of a transistor (552). Each sensor (534) includes a diode (560). In one example, the diode (560), serving as temperature sensors, includes a P-N junction diode. Each diode (550) has a characteristic response to changes in temperature. In particular, each diode (550) has a forward voltage that changes in response to changes in temperature. The diode (550) exhibits a nearly linear relationship between temperature and applied voltage. Because the temperature sensors (530) include diodes or semiconductor junctions, the sensor (500) has a lower cost and can be fabricated upon the strip (26) using semiconductor fabrication techniques.

FIG. 8 is a sectional view of a portion of one example of the sensor (500). In the example illustrated, the strip (26) is supported by the carrier (222) as described above. In one example, the strip (26) includes silicon while the carrier (222) includes a polymer or plastic. In the example illustrated, the heater (530) includes a polysilicon heater which is supported by the strip (26), but separated from the strip (26) by an electrical insulating layer (562), such as a layer of silicon dioxide. In the example illustrated, the heater (530) is further encapsulated by an outer passivation layer (564) which inhibits contact between the heater (530) and the liquid being sensed, the passivation layer (564) protects the heaters (530) and the sensors (534) from damage that would otherwise result from corrosive contact with the liquid or ink being sensed. In one example, the outer passivation layer (564) includes silicon carbide and/or tetraethyl orthosilicate (TEOS). In other examples, layers (562) and (564) may be omitted or may be formed from other materials.

As shown by FIGS. 7 and 8, the construction of the sensor (500) creates various layers or barriers providing additional thermal resistances (R). The pulse of heat emitted by the heater (530) is transmitted across such thermal resistances to the associated sensor (534). The rate at which the heat from a particular heater (530) is transmitted to the associated sensor (534) varies depending upon whether the particular heater (530) is bordered by air (41) or a liquid (42). Signals from the sensor (534) will vary depending upon whether they were transmitted across air (41) or liquid (42). Different signals are used to determine the current level of the liquid (42) within a volume (40).

FIGS. 9A, 9B and 9C illustrate liquid interfaces (624) and (644); other examples of the liquid interface (24). In FIG. 9A, heaters and sensors are arranged in pairs labeled 0, 1, 2, . . . N. The liquid interface (624) is similar to the liquid interface (24) of FIG. 1 except that rather than being interleaved or interdigitated vertically along the length of the strip (26), the heaters (30) and the sensors (34) are arranged in an array of side-by-side pairs vertically along the length of the strip (26).

FIGS. 9B and 9C illustrate a liquid interface (644); another example of the liquid interface (24) of FIG. 1. The liquid interface (644) is similar to the liquid interface (24) of FIG. 1 except that the heaters (30) and sensors (34) are arranged in an array of stacks vertically spaced along the length of strip (26). FIG. 9C is a sectional view of the interface (644) further illustrating the stacked arrangement of the pairs of heaters (30) and sensors (34).

FIGS. 9A-9C additionally illustrate an example of pulsing of the heater (30) of the heater/sensor pair (1), and the subsequent dissipation of heat through the adjacent materials. In FIGS. 9A-9O, the temperature or intensity of the heat dissipates or declines as the heat travels further away from the source of the heat, i.e., the heater (30) of heater/sensor pair (1). The dissipation of heat is illustrated by the change of crosshatching in FIGS. 9A through 9O.

FIG. 10 illustrates a pair of time synchronized graphs of the example pulsing shown in FIGS. 9A-9C. FIG. 10 illustrates the relationship between the pulsing of the heater (30) of the heater sensor pair (1) and the response over time by sensors (34) of the heater/sensor pairs (0, 1, 2, . . . N). As shown by FIG. 10, the response of each of the sensors (34) of each pair (0, 1, 2, . . . N) varies depending upon whether air or liquid is over or adjacent to the respective heater/sensor pair (0, 1, 2, . . . N). The characteristic transient curve and magnitude scale are different in the presence of air versus in the presence of liquid. As a result, signals from interface (644), as well as other interfaces such as interfaces (24) and (624), indicate the level of liquid within the volume.

In one example, a controller, such as the controller (230) described above, determines a level of liquid within the sensed volume by individually pulsing the heater (30) of a pair of heaters/sensors, and compares the magnitude of the temperature, as sensed from the sensor of the same pair, relative to the heater pulsing parameters to determine whether liquid or air is adjacent to the individual heater/sensor pair. The controller (230) carries out such pulsing and sensing for each pair of the array until the level of the liquid within the sensed volume is found or identified. For example, controller (230) may first pulse heater (30) of pair (0) and compare the sensed temperature provided by sensor (34) of pair (0) to a predetermined threshold. Thereafter, controller (30) may pulse heater (30) of pair (1) and compare the sensed temperature provided by sensor (34) of pair (1) to a predetermined threshold. This process is repeated until the level of the liquid is found or identified.

In another example, a controller, such as controller (230) described above, determines a level of liquid within the sensed volume by individually pulsing the heater (30) of a pair and comparing multiple magnitudes of temperature as sensed by the sensors of multiple pairs. For example, controller (230) may pulse the heater (30) of pair (1) and thereafter compare the temperature sensed by sensor (34) of pair (1), the temperature sensed by sensor (34) of pair (0), the temperature sensed by sensor (34) of pair (2), and so on, each temperature resulting from the pulsing of the heater (30) of pair (1). In one example, the controller (230) may utilize the analysis of the multiple magnitudes of temperature from the different sensors (34) vertically along the liquid interface, resulting from a single pulse of heat, to determine whether liquid or air is adjacent to the heater sensor pair including the heater that was pulsed. In such an example, the controller (230) carries out such pulsing and sensing by separately pulsing the heater of each pair of the array and analyzing the resulting corresponding multiple different temperature magnitudes until the level of the liquid (42) within the sensed volume (40) is found or identified.

In another example, the controller (230) may determine the level of the liquid (42) within the sensed volume (40) based upon the differences in the multiple magnitudes of temperature vertically along the liquid interface resulting from a single heat pulse. For example, if the magnitude of temperature of a particular sensor (34) drastically changes with respect to the magnitude of temperature of an adjacent sensor (34), the drastic change may indicate that the level of liquid (42) is at or between the two sensors (34). In one example, the controller (230) may compare differences between the temperature magnitudes of adjacent sensors (34) to a predefined threshold to determine whether the level of the liquid (42) is at or between the known vertical locations of the two sensors (34).

In yet other examples, a controller, such as controller (230) described above, determines the level of the liquid (42) within the sensed volume (40) based upon the profile of a transient temperature curve based upon signals from a single sensor (34) or multiple transient temperature curves based upon signals from multiple sensors (34). In one example, a controller, such as controller (230) described above, determines a level of liquid (42) within the sensed volume (40) by individually pulsing the heater (30) of a pair (0, 1, 2, . . . N) and comparing the transient temperature curve produced by the sensor of the same pair (0, 1, 2, . . . N), relative to the predefined threshold or a predefined curve to determine whether liquid (42) or air (41) is adjacent to the individual heater/sensor pair (0, 1, 2, . . . N). The controller (230) carries out such pulsing and sensing for each pair (0, 1, 2, . . . N) of the array until the level of the liquid (42) within the sensed volume (40) is found or identified. For example, controller (230) may first pulse heater (30) of pair (0) and compare the resulting transient temperature curve produced by sensor (34) of pair (0) to a predetermined threshold or predefined comparison curve. Thereafter, the controller (230) may pulse heater (30) of pair (1) and compare the resulting transient temperature curve produced by the sensor (34) of pair (1) to a predetermined threshold or predefined comparison curve. This process is repeated until the level of the liquid (42) is found or identified.

In another example, a controller, such as controller (230) described above, determines a level of the liquid (42) within the sensed volume (40) by individually pulsing the heater (30) of a pair (0, 1, 2, . . . N) and comparing multiple transient temperature curves produced by the sensors (43) of multiple pairs (0, 1, 2, . . . N). For example, the controller (230) may pulse the heater (30) of pair (1) and thereafter compare the resulting transient temperature curve produced by the sensor (34) of pair (1), the resulting transient temperature curve produced by the sensor (34) of pair (0), the resulting transient temperature curve produced by the sensor (34) of pair (2), and so on, each transient temperature curve resulting from the pulsing of the heater (30) of pair (1). In one example, the controller (230) may utilize the analysis of the multiple transient temperature curves from the different sensors (34) vertically along the liquid interface, resulting from a single pulse of heat, to determine whether liquid (42) or air (41) is adjacent to the heater sensor pair (0, 1, 2, . . . N) including the heater (30) that was pulsed. In such an example, the controller (230) carries out such pulsing and sensing by separately pulsing the heater (30) of each pair (0, 1, 2, . . . N) of the array and analyzing the resulting corresponding multiple different transient temperature curves until the level of the liquid (42) within the sensed volume (40) is found or identified.

In another example, the controller (230) may determine the level of liquid (42) within the sensed volume (40) based upon the differences in the multiple transient temperature curves produced by different sensors (34) vertically along the liquid interface resulting from a single heat pulse. For example, if the transient temperature curve of a particular sensor (34) drastically changes with respect to the transient temperature curve of an adjacent sensor (34), the drastic change may indicate that the level of liquid (42) is at or between the two sensors (34). In one example, the controller (230) may compare differences between the transient temperature curves of adjacent sensors (34) to a predefined threshold to determine whether the level of the liquid (42) is at or between the known vertical locations of the two sensors (0, 1, 2, . . . N).

FIGS. 11 and 12 illustrate a sensor (700); an example of sensor (500) of FIGS. 6-8. The sensor (700) includes a carrier (722), a liquid interface (224), an electrical interface (726), a driver (728), and a collar (730). The carrier (722) is similar to the carrier (222) described above. In the example illustrated, the carrier (722) includes a molded polymer. In other examples, the carrier (722) may include a glass or other materials.

The liquid interface (224) is described above. The liquid interface (224) is bonded, glued, or otherwise adhered to a face of the carrier (722) along the length of the carrier (722). The carrier (722) may be formed from, or include, glass, polymers, FR4, or other materials.

The electrical interface (726) includes a printed circuit board including electrical contact pads (236) for making an electrical connection with the controller (230) described above with respect to FIGS. 3-5. In the example illustrated, electrical interface (726) is bonded or otherwise adhered to the carrier (722). The electrical interface (726) is electrically connected to the driver (728) as well as the heaters (530) and sensors (534) of the liquid interface (224) of, for example, FIG. 6. In one example, the driver (728) includes an application-specific integrated circuit (ASIC) which drives the heaters (530) and the sensors (534) in response to signals received through the electrical interface (726). In other examples, the driving of the heaters (530) and the sensing by the sensors (534) may alternatively be controlled by a fully integrated driver circuit in lieu of an ASIC.

The collar (730) extends about the carrier (722), and serves as a supply integration interface between carrier (722) and the liquid container (40) in which the sensor (700) is used to detect the level of the liquid (42) within the volume (40). In some examples, the collar (730) provides a liquid seal, separating liquid contained within the volume (40) that is being sensed and electrical interface (726). As shown by FIG. 11, in some examples, the driver (728) as well as the electrical connections between driver (728), the liquid interface (224), and the electrical interface (726) are further covered by a protective electrically insulating wire bond adhesive or encapsulant (735) such as a layer of epoxy molding compound.

Figure 13:
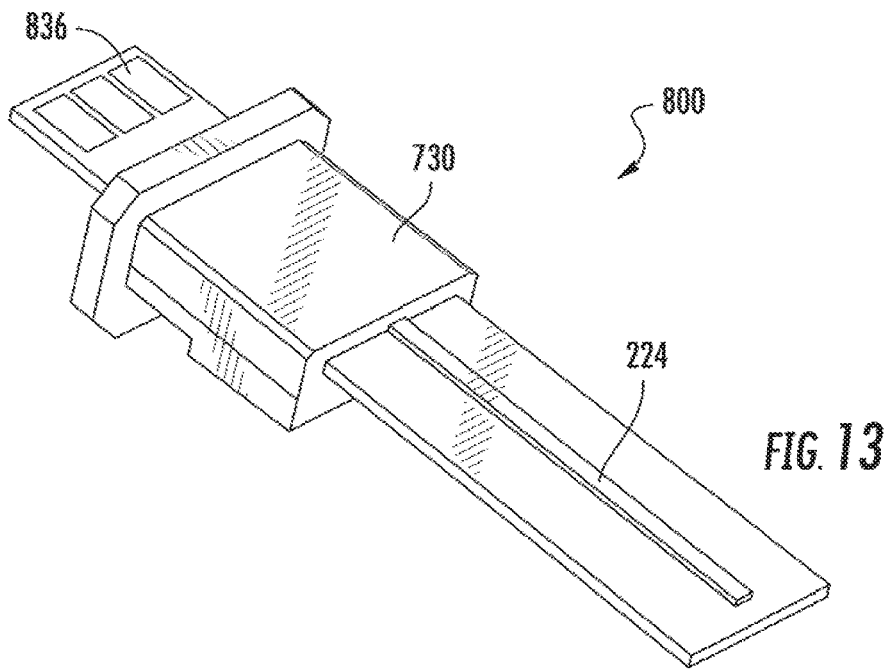
FIG. 13 is a perspective view of another example fluid level sensor, according to one example of the principles described herein.
Figure 14:
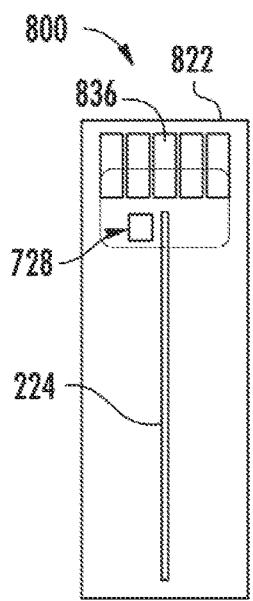
FIG. 14 is a front view of the example fluid level sensor of FIG. 13, according to one example of the principles described herein.
Figures 15, 17:
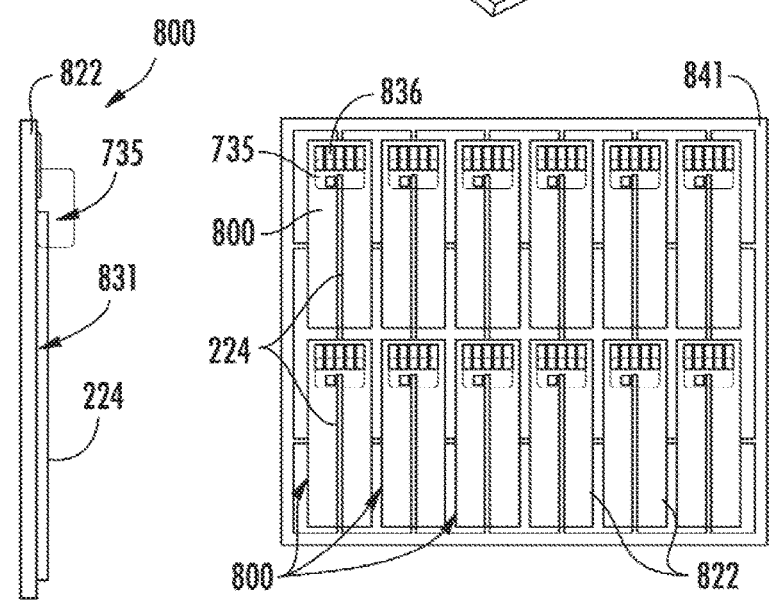
FIG. 15 is a sectional view of the example fluid level sensor of FIG. 14, according to one example of the principles described herein.
FIG. 17 is a front view of an example panel upon which multiple fluid level sensors have been formed, prior to singulation, according to one example of the principles described herein.

FIGS. 13-15 illustrate a sensor (800); another example of the sensor (500) of FIGS. 6-8. The sensor (800) is similar to sensor (700) except that the sensor (800) of FIGS. 13-15 includes a carrier (822) in place of the carrier (722), and omits the electrical interface (726). The carrier (822) includes a printed circuit board or other structure including embedded electrical traces and contact pads to facilitate electrical connection between various electronic components mounted upon the carrier (822). In one example, the carrier (822) includes a composite material composed of woven fiberglass cloth with an epoxy resin binder. In one example, the carrier (822) includes a glass-reinforced epoxy laminate sheet, tube, rod or printed circuit board, such as an FR4 printed circuit board.

As shown by FIGS. 14 and 15, the liquid interface (224) is bonded to the carrier (822) by a die attach adhesive (831). The liquid interface (224) is further wire bonded to the driver (728) and the electrical contact pads (836) provided as part of the carrier (822). The encapsulant (735) overlays or covers the wire bonds between the liquid interface (224), the driver (728), and the electrical contact pads (836). As shown by FIG. 13, the collar (730) is positioned about the encapsulant (735) between a lower end of liquid interface (224) and the electrical contact pads (836).

Figure 16:
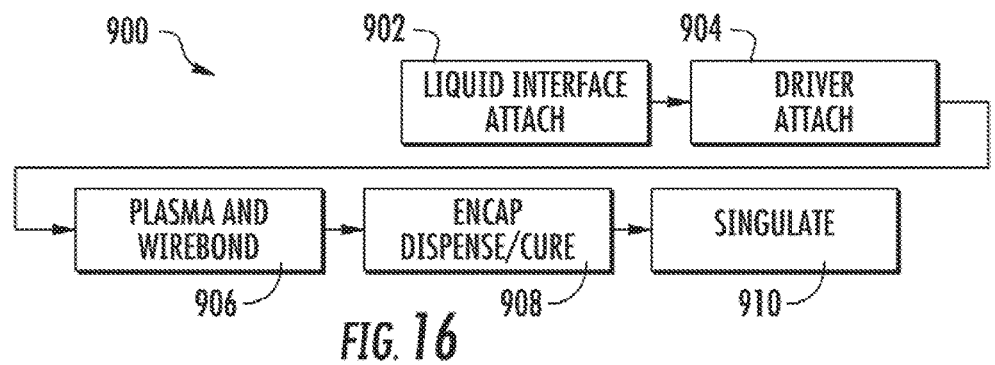
FIG. 16 is a flow diagram of an example method for forming the example fluid level sensor of FIG. 13, according to one example of the principles described herein.
Figure 18A:
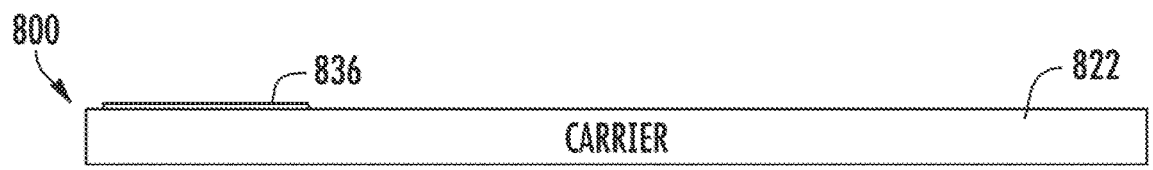
FIGS. 18A-18E are sectional views illustrating the example fluid level sensor of FIG. 13 as it is being formed, according to one example of the principles described herein.
Figure 18B:
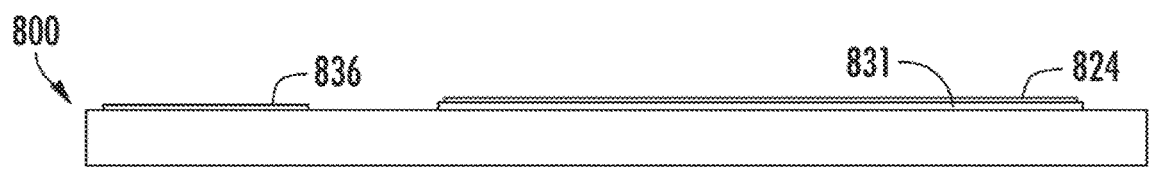

FIGS. 16, 17 and 18A-18E illustrate one example method for forming a fluid level sensor (800). FIG. 16 illustrates a method (900) for forming the fluid level sensor (800). As indicated by block 902, the liquid interface (224) is attached to the carrier (822). As indicated by block 904, the driver (728) is also attached to the carrier (822). FIG. 18A illustrates the carrier (822) prior to the attachment of liquid interface (224) and driver (728). FIG. 18B illustrates the sensor (800) after the attachment of the interface (224) and the driver (728) depicted in FIG. 14 with the adhesive layer (831). In one example, the adhesive layer (831) is stamped upon the carrier (822) to precisely locate the adhesive layer (831). In one example, the attachment of the liquid interface to (24) the driver (728) further includes curing of the adhesive layer (831).

Figure 18C:
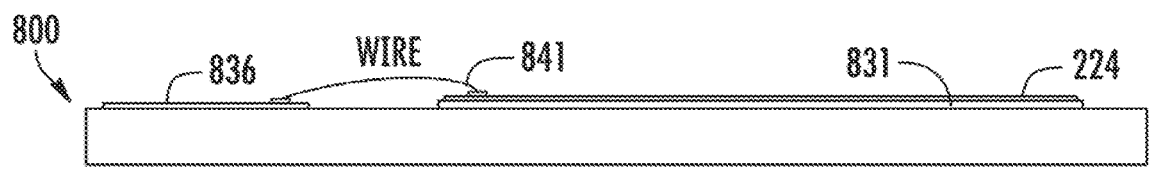
Figure 18D:
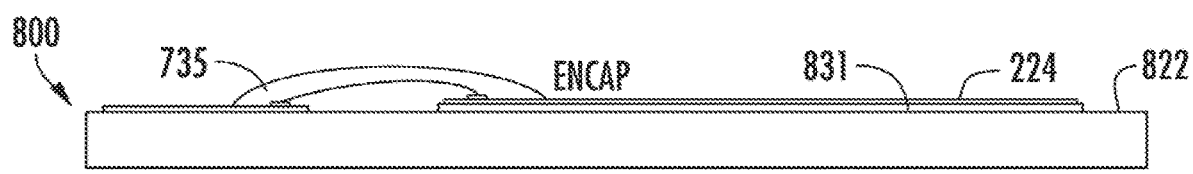
Figure 18E:
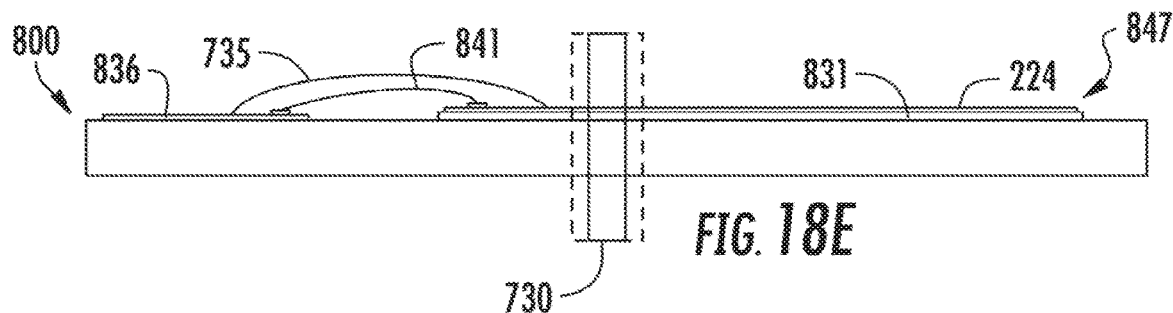

As indicated by block 906 of FIG. 16, the liquid interface (224) is wire bonded to the contact pads (836) of the carrier (822) serving as an electrical interconnect. As indicated by block 908 in FIG. 16, the wire bonds (841) shown in FIG. 18C are then encapsulated within the encapsulant (735). In one example, the encapsulant is cured. As depicted in FIG. 17, in one example, multiple sensors (800) may be formed as part of a single panel (841). For example, a single FR4 panel including electrically conductive traces and contact pads for multiple sensors (800) may be used as a substrate upon which the liquid level sensing interface (224), the drivers (728), and the encapsulant (735) may be formed. As indicated by block 910 of FIG. 16, in such an example, the individual sensors (800) are singulated from the panel. As illustrated by FIG. 18E, in applications where the sensor (800) is to be incorporated as part of a liquid or fluid supply, the collar (730) is further secured to the carrier (822) between the wire bonds (841) and the lower end (847) of the liquid level sensing interface (224). In one example, the collar (730) is adhesively bonded to the carrier (822) by an adhesive that is subsequently cured.

FIGS. 19A through 24 describe a fluid level sensor according to another example of the principles described herein. The examples described in connection with FIGS. 19A through 24 include a molded sliver wherein the various elements of the fluid level sensor are overmolded. In one example, the overmold is an epoxy molding compound (EMC) that is used to hold multiple fluid level sensors in place. The inexpensive molded substrate formed by the EMC also provides physical support for interconnect traces, and supports wire bonding. Overmolded fluid level sensors are several times less expensive to manufacture. To further reduce the cost, electrical interconnects are extended from the slivers to printed circuit boards (PCB) or lead frames. The PCBs or lead frames connect the slivers to an electrical interface so the fluid level sensor may be connected to an electrical contact of a printing device directly instead of using expensive tape-automated bonding (TAB) circuits or surface-mounted technology (SMT) connectors. Thus, the overmolded fluid level sensors and their respective electrical interconnects may simplify the design and the assembly processes.

Figure 19A:
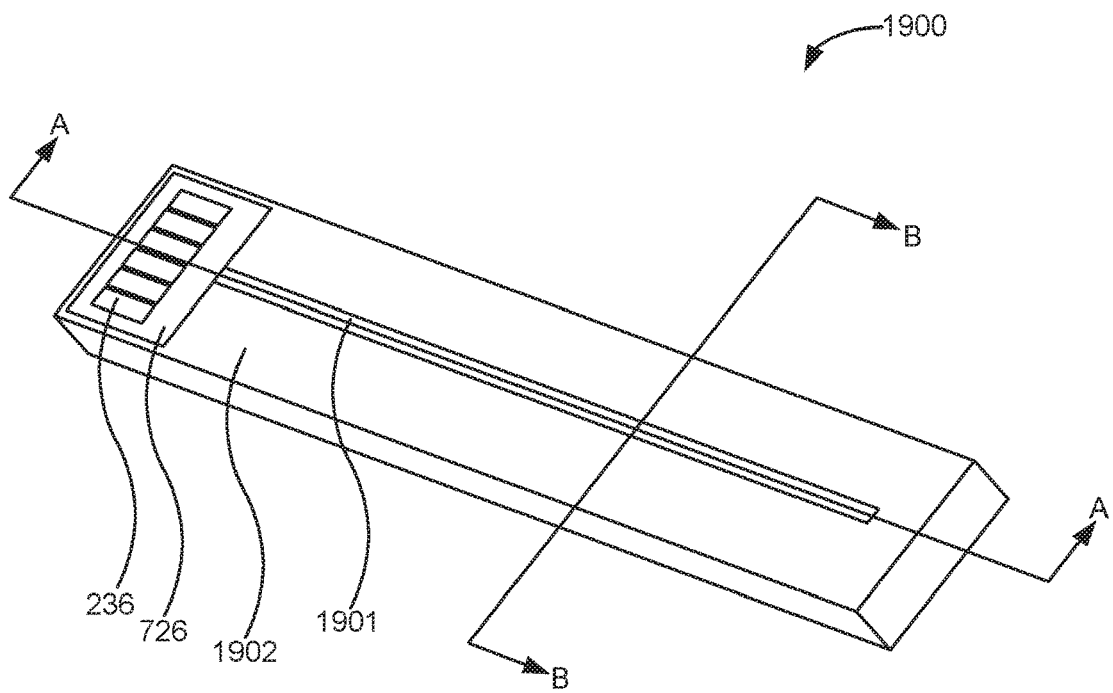
FIG. 19A is an isometric view of a fluid level sensor, according to one example of the principles described herein.

FIG. 19A is an isometric view of a fluid level sensor (1900), according to one example of the principles described herein. The fluid level sensor (1900) includes an electrical interface (726) including a printed circuit board including electrical contact pads (236) for making an electrical connection with the controller (230) as described above with respect to FIGS. 3-5. The fluid level sensor (1900) further includes a sliver die (1901) overmolded with the electrical interface (726) into a moldable substrate (1902).

Figure 19B:
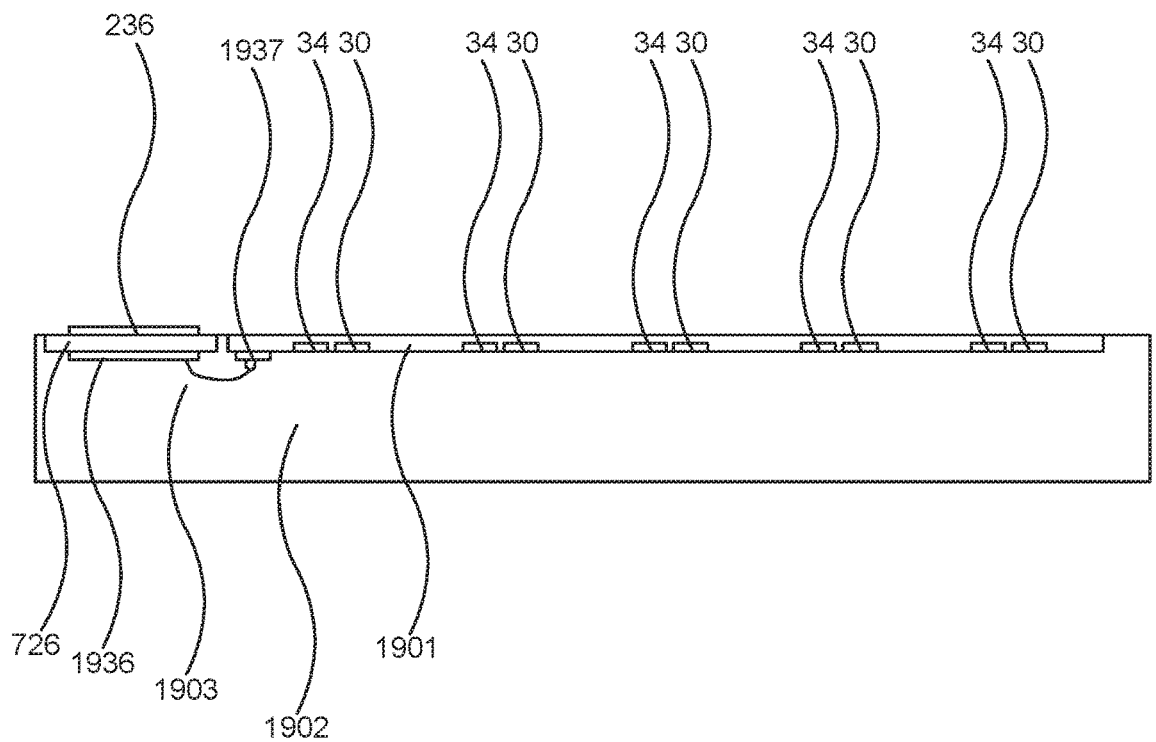
FIG. 19B is a side, cutaway view of the fluid level sensor of FIG. 19A along line A, according to one example of the principles described herein.

FIG. 19B is a side, cutaway view of the fluid level sensor (1900) of FIG. 19A along line A, according to one example of the principles described herein. The electrical interface (726) is electrically coupled to the sliver die (1901) via a wire bond (1903) extending between a contact pads (1936) located on a side of the electrical interface (726) opposite the electrical contact pads (236), and an electrical contact pad (1937) located on the sliver die (1901). An array of heaters (30) and sensors (34) are disposed on the sliver die (1901) on a side opposite where the fluid level sensor (1900) comes into contact with air (41) or a liquid (42) as will be described in more detail below. Although several heaters (30) and sensors (34) are disposed on the sliver die (1901) of FIG. 19B, any number of heaters (30) and sensors (34) may be disposed on the sliver die (1901) as described herein.

FIGS. 20A through 20G are side views of the fluid level sensor (1900) of FIG. 19A during a manufacturing process, according to one example of the principles described herein. The manufacturing process of the fluid level sensor (1900) is reduced due to the use of the overmold process. The manufacturing process may begin at FIG. 20A by preparing a silicon die (2001) with an array of heaters (30) and sensors (34) disposed thereon. In one example, the array of heaters (30) and sensors (34) may be thin films or other types of layers of material ranging from fractions of a nanometer to several micrometers in thickness. The electrical contact pad (1937) is also disposed on the silicon die (2001) to allow for electrical coupling between the array of heaters (30) and sensors (34) and other circuitry and control logic.

Figure 20A:
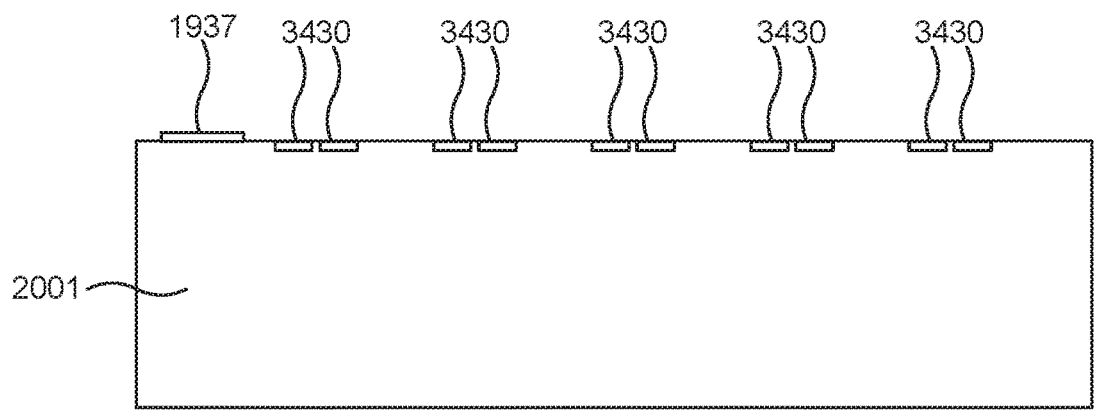
FIGS. 20A through 20F are side views of the fluid level sensor of FIG. 19A during a manufacturing process, according to one example of the principles described herein.
Figure 20B:
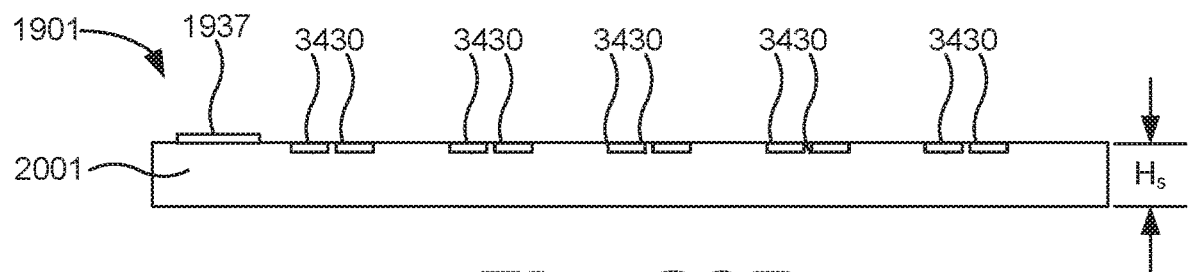

In one example, the silicon die (2001) has a thickness of between approximately 10 μm to 100 μm as designated by $H_s$ in FIG. 20B. This provides a sufficiently high thermal transfer rate (Δt) within the silicon die (2001) and allows for fluid such as air (41) or liquid (42) to be detected by the sensors (34) through the silicon die (2001). In one example, the thinner the silicon substrate is, the more sensitive the architecture is to detection of the thermal transfer rate (Δt). Thus, in FIG. 20B, the silicon die (2001) is thinned to achieve a desired Δt. The Δt may be defined as a temperature difference between a sensor (34) that is juxtaposition to air (41) and a sensor (34) that is juxtaposition to liquid (42). In one example, the silicon die (2001) may be subjected to a dice process where the silicon die (2001) is cut out of a wafer. At this point, the sliver die (1901, FIGS. 19A and 19B) has been formed.

Figure 20C:
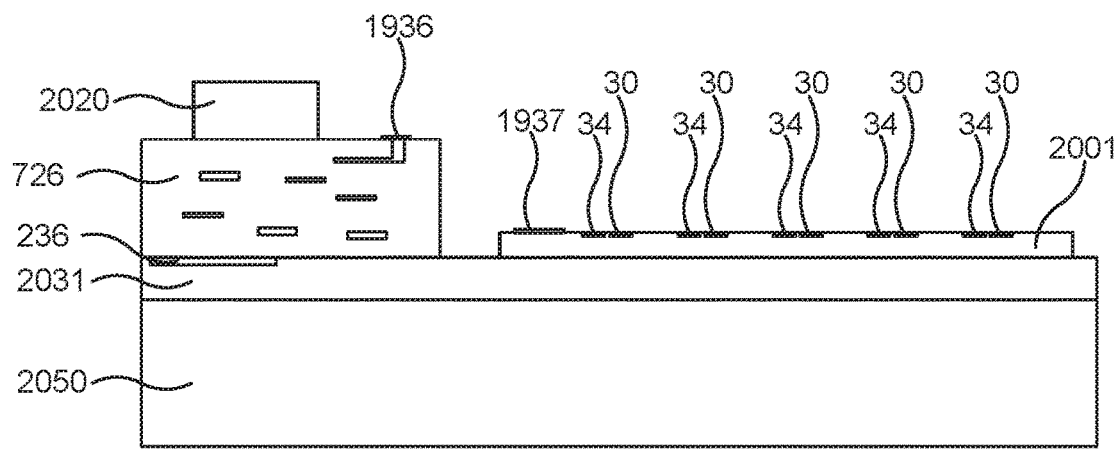

The manufacturing process may continue with adhering the sliver die (1901, FIGS. 19A and 19B) including the silicon die (2001), and the electrical interface (726) to a carrier (2050) as depicted in FIG. 20C. The sliver die (1901, FIGS. 19A and 19B) and the electrical interface (726) are coupled to the carrier (2050) via a temporary bonding adhesive (2031) such as an Revalpha thermal release adhesive tape by Nitto Denko. The carrier (2050) assists in temporarily holding the sliver die (1901, FIGS. 19A and 19B) and the electrical interface (726) in position and repositioning or transporting the assembly before and during an overmolding process, as will be described below in more detail.

Figure 20D:
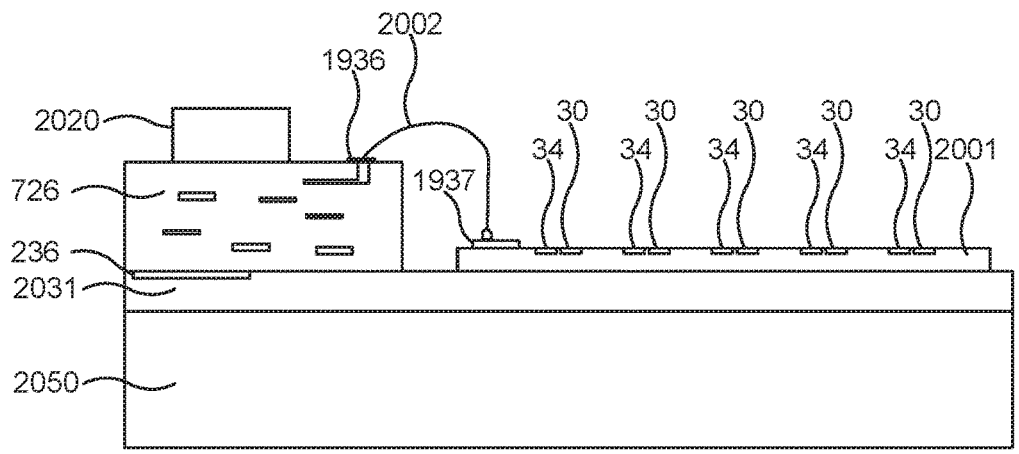

In order to electrically couple the sliver die (1901, FIGS. 19A and 19B) to the electrical interface (726), a wire bond (2002) is included as depicted in FIG. 20D. The wire bond (2002) connects the electrical contact pad (1937) located on the sliver die (1901) with the contact pads (1936) located on the side of the electrical interface (726) opposite the electrical contact pads (236).

As described above, the electrical interface (726) includes electrical contact pads (236). The electrical interface may also include a number of surface mount technologies (SMTs) (2020) such as an integrated circuit package that are electrically coupled to the sliver die (1901). However, the examples described in connection with FIGS. 18A through 18E depicting a system that does not include SMTs (2020) may also benefit from the manufacturing process described here in connection with FIGS. 20A through 20G.

Figure 20E:
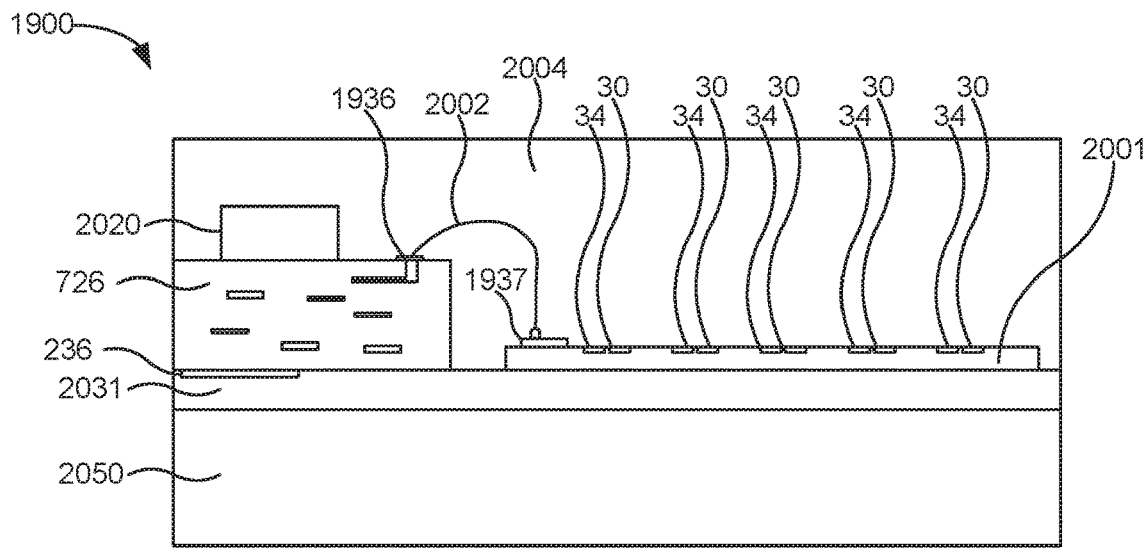

Moving on to FIG. 20E, the electrical interface (726), the first side of the silicon die (2001) of the sliver die (1901) on which the array of heaters (30) and sensors (34) are disposed, and the wire bond (2002) are overmolded with an overmold material (2004) to form an overmolded fluid level sensor (1900). In one example, the overmold material (2004) may be an epoxy molding compound (EMC) as described above. EMC is broadly defined herein as any material including at least one epoxide functional group. In one example, the EMC is a self-cross-linking epoxy. In this example, the EMC may be cured through catalytic homopolymerization. In another example, the EMC may be a polyepoxide that uses a co-reactant to cure the polyepoxide. Curing of the EMC in these examples forms a thermosetting polymer with high mechanical properties, and high temperature and chemical resistance.

In one example, a plurality of sets of electrical interfaces (726), sliver dies (1901), and wire bonds (2002) may be overmolded together into a monolithic overmolded substrate. In this example, in order to separate the sets, the monolithic overmolded substrate may be cut or separated to form the individual overmolded fluid level sensors (1900). Any type of cutting process may be used including, for example, saw or laser dicing.

In one example, an overmold of EMC may be used to hold sliver dies (1901) and electrical interface (726) in place as depicted in FIGS. 20A through 20E. The inexpensive molded substrate formed by the EMC provides physical support for the wire bond (2002). Further, overmolded fluid level sensor (1900) are several times less expensive to manufacture; a cost that may be reflected in a retail price of the overmolded fluid level sensor (1900) or a device in which the overmolded fluid level sensor (1900) is incorporated. Further, the overmolded fluid level sensor (1900) may simplify a fluid reservoir assembly process since the overmolded fluid level sensor (1900) may be integrated into a volume (40) as a single unit.

To further reduce the cost in manufacturing, electrical interconnects may be extended from the array of heaters (30) and sensors (34) to printed circuit boards (PCB) or lead frames. In this example, the PCBs or lead frames connect the array of heaters (30) and sensors (34) to the edge of the sliver die (1901) so the overmolded fluid level sensor (1900) may be connected to an electrical contact of a printing device directly instead of using expensive tape-automated bonding (TAB) circuits or surface-mounted technology (SMT) connectors. Thus, the overmolded fluid level sensors (1900) and their respective electrical interconnects simplify the design and assembly process of a fluid level sensor.

With reference again to FIG. 20E, the electrical interface (726), the sliver die (1901), and the wire bond (2002) are completely embedded within the molding material (2004). As to the electrical interface (726), a first side of the electrical interface (726) is completely embedded within the molding material (2004) and the contact pads (236) remain exposed in order to allow for electrical signals to travel through the electrical interface (726) and to the sliver die (1901) via the wire bond (2002).

As to the wire bond (2002), the complete embedding of the wire bond (2002) within the molding material (2004) provides a higher reliability of the overmolded fluid level sensor (1900) since the wire bond (2002) is not exposed to atmosphere or to fluids such as those fluids contained in the volume (40). This may reduce, and in some instances even eliminate, the possibility of the atmosphere or fluids degrading or chemically reacting with the wire bond (2002).

As to the sliver die (1901), the first side of the silicon die (2001) of the sliver die (1901) on which the array of heaters (30) and sensors (34) are disposed is completely embedded within the molding material (2004) in this example. It is noted that the first side need not be completely embedded within the molding material in all instances. Like the bonding wire (2002), the embedding of the array of heaters (30) and sensors (34) in the molding material (2004) may reduce, and in some instances even eliminate, the possibility of the atmosphere or fluids degrading or chemically reacting with the array of heaters (30) and sensors (34). This may increase reliability of the overmolded fluid level sensor (1900).

Figure 20F:
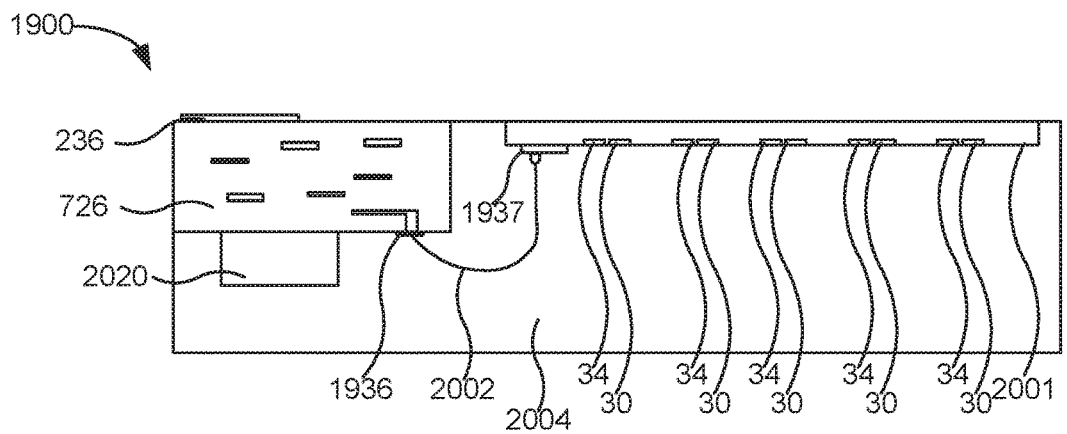

Turning now to FIG. 20F, the overmolded fluid level sensor (1900) is depicted in an inverted orientation relative to, for example, FIG. 20E. Further, in FIG. 20F, the carrier (2050) has been removed. Since the carrier (2050) does not serve a functional purpose with respect to the operation of the overmolded fluid level sensor (1900), and assists in the manufacturing process, the carrier (2050) may be removed. In one example, the temporary bonding adhesive (2031) may be a releasable adhesive that may be selectively removed after, for example, the manufacturing of the overmolded fluid level sensor (1900) has completed. In this manner, the carrier (2050) may be selectively removed from the overmolded fluid level sensor (1900).

In one example, a plurality of arrays of heaters (30) and sensors (34) may be included in an overmolded fluid level sensor (1900). In this example, the plurality of arrays of heaters (30) and sensors (34) are daisy chained where the plurality of arrays are wired in sequence relative to one another. The plurality of arrays may be overmolded together along with, for example, the electrical interface (726) within the overmold material (2004) to form an overmolded fluid level sensor (1900) with the embedded, daisy-chained arrays.

Figure 21:
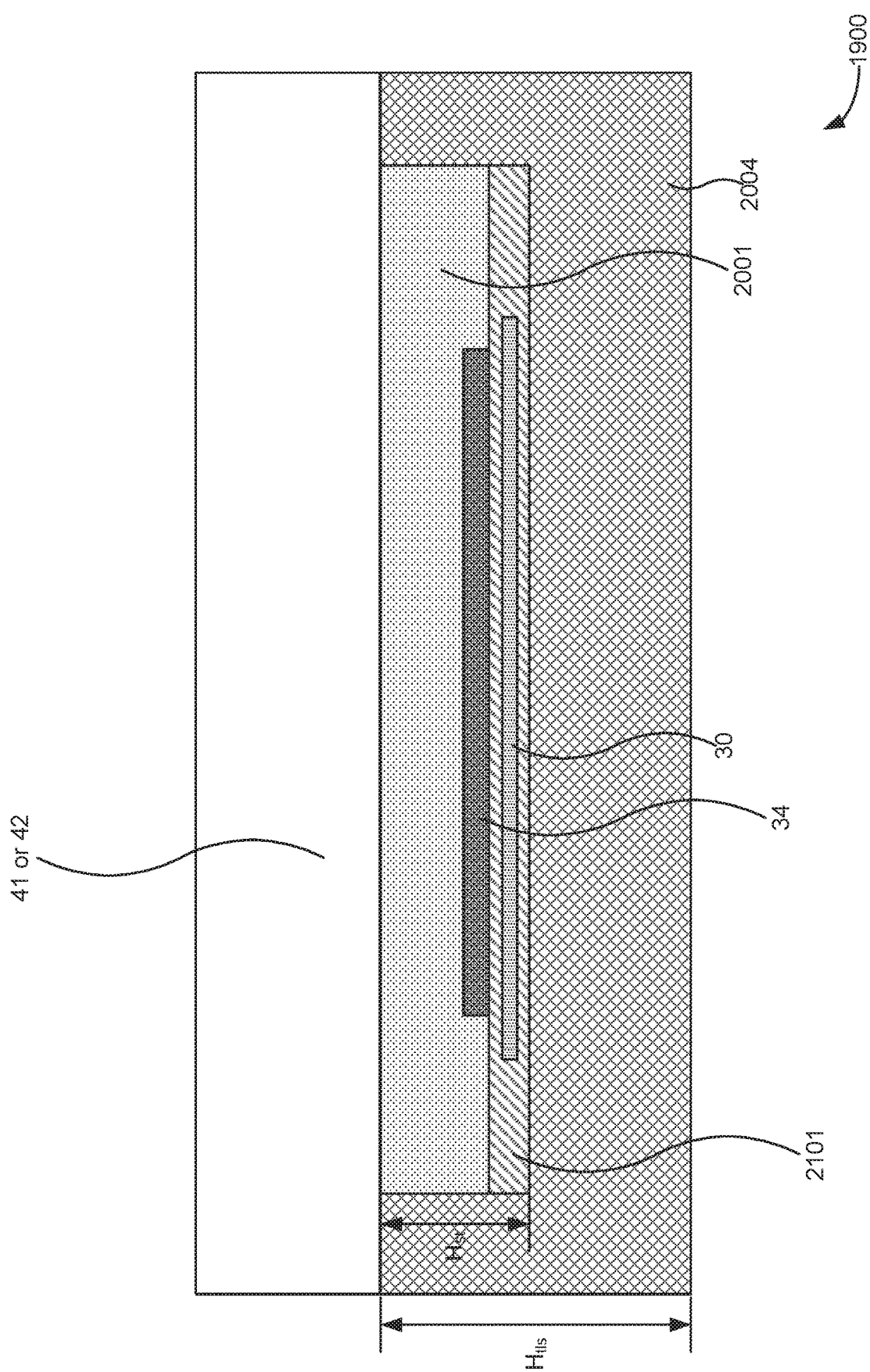
FIG. 21 is a sectional view of the fluid level sensor of FIG. 19A along line B, according to one example of the principles described herein.

FIG. 21 a sectional view of the fluid level sensor (1900) of FIG. 19A along line B, according to one example of the principles described herein. The example of FIG. 21 is an example of an overmolded fluid level sensor (1900) such as described in connection with FIGS. 20A though 20F. The fluid level sensor (1900) includes a sensor (34) formed or embedded within the silicon die (2001). The sensor (34), as described above, is located on a side of the silicon die (2001) opposite the air (41) or liquid (42) into which the fluid level sensor (1900) is immersed.

A layer of tetraethyl orthosilicate (TEOS) (2101) is placed below the sensor (34) such that three sides of the sensor (34) abut the silicon die (2001), and the fourth side of the sensor (34) abuts the TEOS layer (2101). TEOS is a chemical compound with the formula $Si(OC_2H_5)_4$. A heater (30) is disposed on all sides within the TEOS layer (2101).

Further, the overmold material (2004) surrounds three sides of the silicon die (2001) and three sides of the TEOS layer (2101). In this manner, the heater (30) and the sensor (34) are entirely isolated from the air (41) or liquid (42). In the example of FIG. 21, the overmold material (2004) is flush with the surface of the silicon die (2001) that is exposed to the air (41) or liquid (42). However, in other examples, the overmold material (2004) may extend below the surface of the silicon die (2001) that is exposed to the air (41) or liquid (42) to expose portions of the sides of the silicon die (2001).

The height of the fluid level sensor (1900) designated as $H_{fls}$ in FIG. 21 may be approximately 1 millimeter (mm). Further, the height of the silicon die (2001) and TEOS layer (2101) designated as $H_{st}$ in FIG. 21 may be approximately between 0.01 and 0.1 mm. Although the arrangement of the heater (30) and the sensor (34) are depicted as being layered one above another, any arrangement or configuration of the heaters (30) and the sensors (34) within the fluid level sensor (1900) including those arrangements described herein that include the heaters (30) and the sensors (34) on a side of the silicon die (2001) that is not exposed to the air (41) or liquid (42) may be employed.

Figure 22:
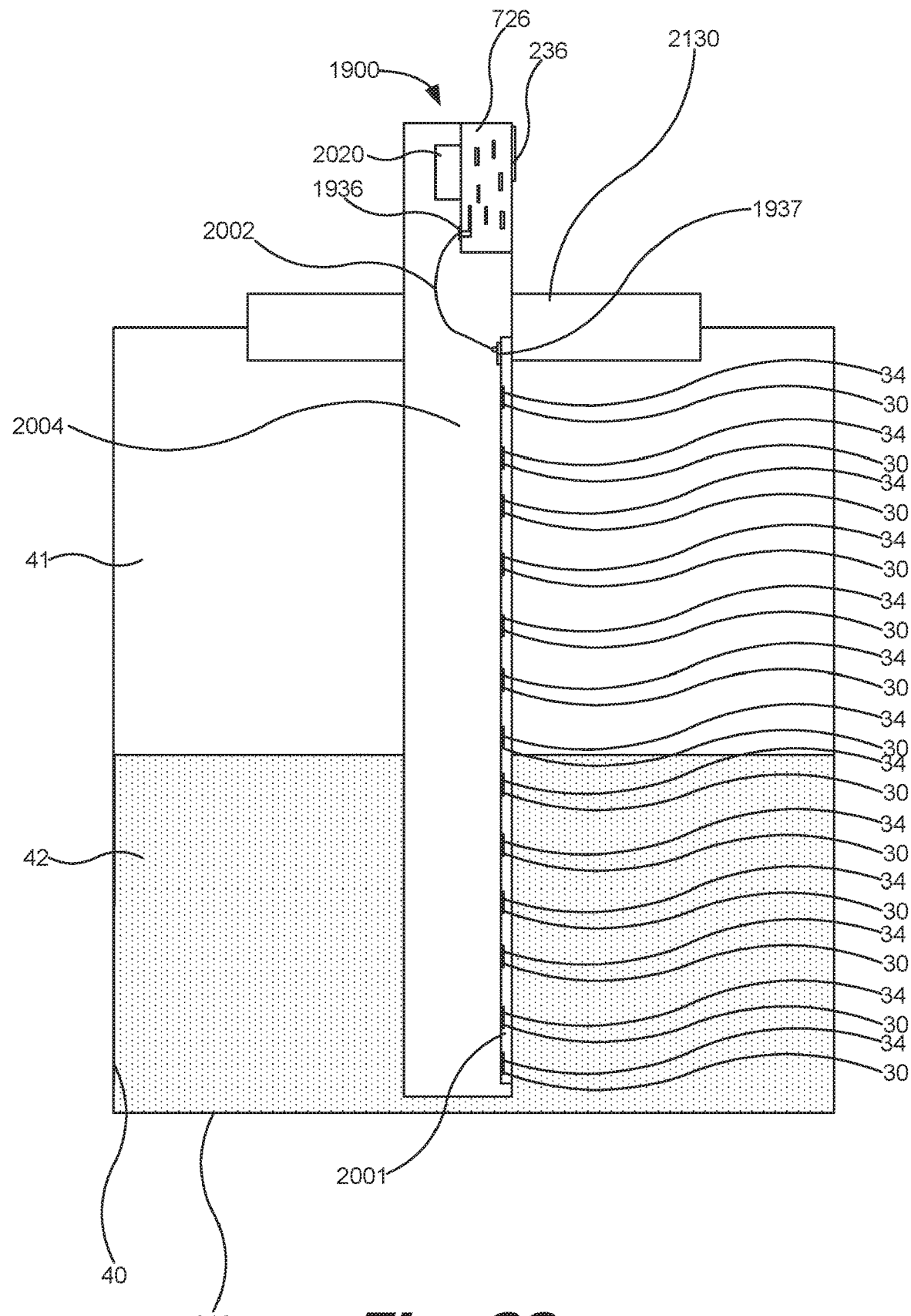
FIG. 22 is a side cutaway view of the fluid level sensor of FIG. 19A coupled to a volume of fluid, according to one example of the principles described herein.

FIG. 22 is a side cutaway view of the fluid level sensor (1900) of FIG. 19A coupled to a volume (40) of fluid (41, 42), according to one example of the principles described herein. The volume (40) as described herein is nay container that holds a number of fluids (41, 42). In one example, the fluids include air (41) and printable fluid (42) such as an ink. The fluid level sensor (1900) extends into the interior of the volume (40) as similarly described above in connection with FIGS. 4 and 5. Thus, description of similar elements included in FIG. 22 may be found above in connection with the descriptions of FIGS. 4 and 5. The example of FIG. 22, however, further includes a collar (2130) to seal any spaces within the interface of the volume (40) and the fluid level sensor (1900). In one example, the collar (2130) may be an overmold on top of the overmolded fluid level sensor (1900, 2005). In this example, additional overmold material (2004) is applied to the overmolded fluid level sensor (1900) to fill any spaces within the interface of the volume (40) and the fluid level sensor (1900). In another example, a sealing feature may be formed during, for example, transfer molding of the fluid level sensor (1900) that creates an interface between the volume (40) and the fluid level sensor (1900). In this example, additional gaskets or other sealing elements may be coupled to the sealing feature to assist in the sealing of the volume (40) with respect to the overmolded fluid level sensor (1900).

Figure 23:
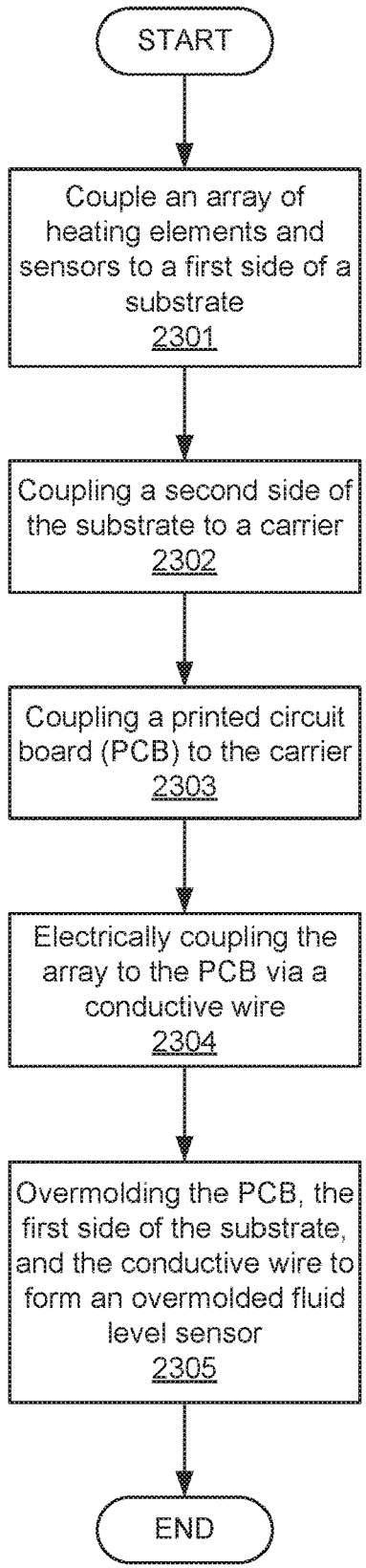
FIG. 23 is a flowchart showing a method of forming a fluid level sensor for a printable fluid reservoir, according to one example of the principles described herein.

FIG. 23 is a flowchart showing a method of forming a fluid level sensor for a printable fluid reservoir, according to one example of the principles described herein. The method of FIG. 23 may begin by coupling (block 2301) an array of heating elements (30) and sensors (34) to a first side of a substrate such as, for example, the silicon die (2001). In one example, the substrate (2001) may be thinned to approximately 100 micrometers (μm) or less.

The second side of the substrate (2001) is coupled (block 2302) to a carrier (2050). Further, an electrical interface (726) is coupled (block 2303) to the carrier (2050). In one example, coupling (block 2302, 2303) the substrate (2001) and the electrical interface (726) to the carrier (2050) includes coupling the substrate (2001) and the electrical interface (726) to the carrier (2050) via a releasable adhesive. Further, in one example, the method of FIG. 23 may further include removing the carrier (2050). Removing the carrier (205) may include removing the carrier via a releasable adhesive used to couple the carrier (2050) to the substrate (2001) and the electrical interface (726).

The array is electrically coupled (block 2304) to the electrical interface (726) via a conductive wire such as the wire bond (2002). The electrical interface (726), the first side of the substrate (2001), and the conductive wire (2002) are overmolded (block 2305) to form an overmolded fluid level sensor (1900). In one example, coupling (block 2301) the array of heating elements (30) and the sensors (34) to the first side of a substrate (2001) includes coupling the heating elements (30) to the first side of a substrate, and coupling the sensors (34) to the first side of the substrate juxtaposition to the heating elements (30). This allows the heating elements (30) to provides heat to the silicon die (2001) for the sensor (34) to detect, determine a cooling rate, and determine whether that portion of the overmolded fluid level sensor (1900) is exposed to air (41) or fluid (42) based on the detected cooling rate.

In one example, the method may include coupling the overmolded fluid level sensor (1900) to a container (312). In this example, the overmolded fluid level sensor (1900) protrudes into the container (312). Further, the method may include sealing the container (312) with respect to an exterior of the container (312) and the overmolded fluid level sensor (1900). Still further, in one example, the method may include singulating individual fluid level sensor (1900) from a panel of fluid level sensors (1900) that have been formed and overmolded together.

Figure 24:
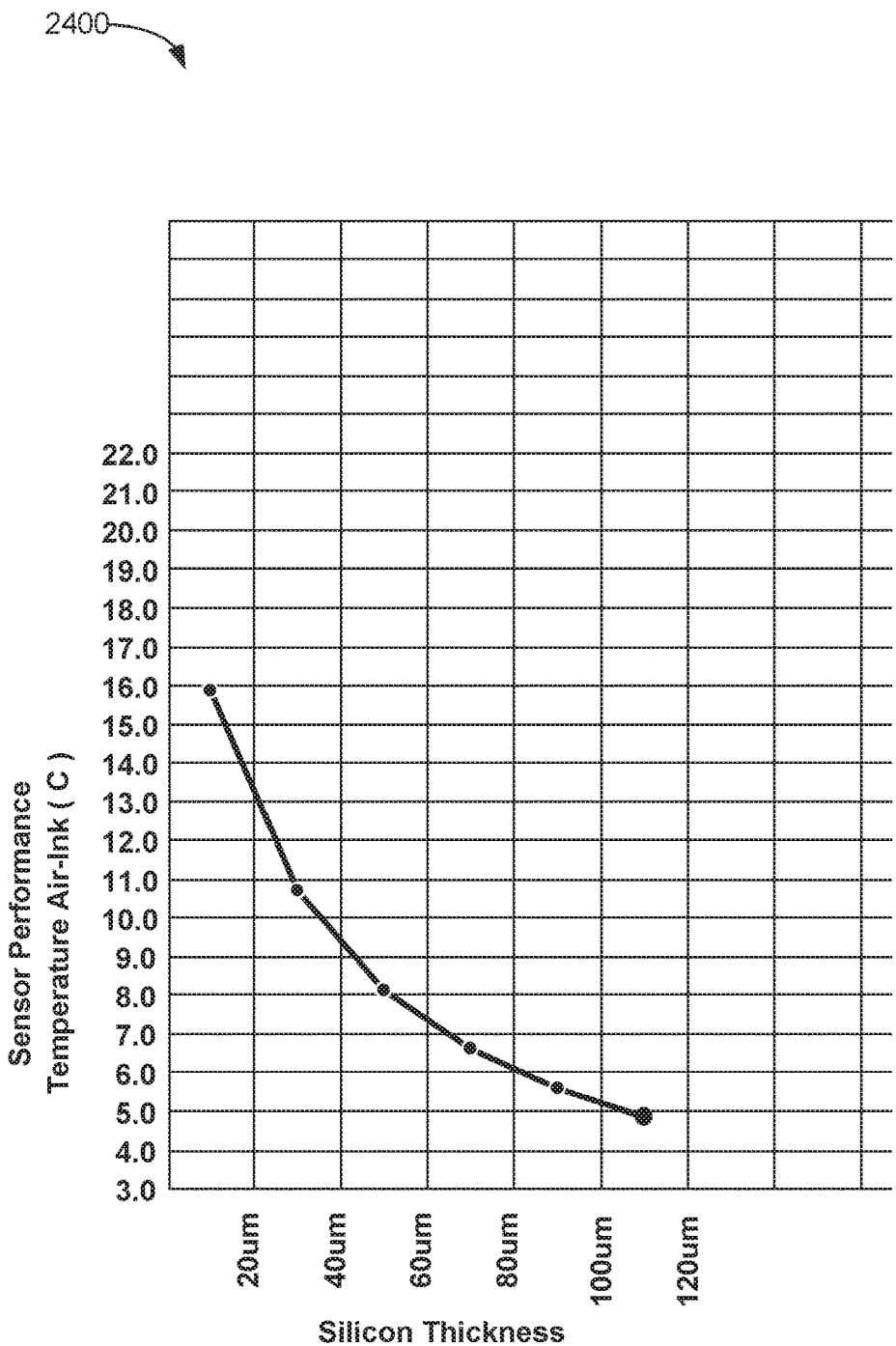
FIG. 24 is a graph depicting the effect of silicon thickness on sensor performance within the fluid level sensor of FIG. 19A, according to one example of the principles described herein.

FIG. 24 is a graph (2400) depicting the effect of silicon thickness on sensor (34) performance within the overmolded fluid level sensor (1900) of FIG. 19A, according to one example of the principles described herein. The graph (2400) depicts sensor performance as a function of silicon thickness. As depicted in the graph (2400), the correlation between silicon thickness and sensor (34) performance is no-linear. As the thickness of the silicon die (2001) as designated by $H_s$ in FIG. 20B increases, the performance of the sensor (34) may decrease due to the inability of the sensor (34) to detect a change in temperature due to the ever-increasing thickness of the silicon. In other words, as the thickness of the silicon die (2001) increases, the silicon die (2001) may act as a heat sink and dampen heat transfer through the silicon die (2001). Thus, the above-described thermal transfer rate (Δt) may decrease. As the thickness of the silicon die (2001) reaches a threshold, it may become difficult or in some instances even impossible for the sensors (34) to detect a change in temperature.

In contrast, however, as the thickness of the silicon die (2001) decreases, the ability of the sensors (34) to detect a change in temperature through the silicon die (2001) increases. For example, as depicted in the graph (2400), at a 100 μm silicon die (2001) thickness, the Δt is approximately 5.5° C. At an 80 μm silicon die (2001) thickness, the Δt increases to approximately 6.5° C. At a 60 μm silicon die (2001) thickness, the Δt increases to approximately 8.0° C. At a 40 μm silicon die (2001) thickness, the Δt increases to approximately 10.6° C. At a 20 μm silicon die (2001) thickness, the Δt increases to approximately 16.0° C. However, moving in the other direction, at a 120 μm silicon die (2001) thickness, the Δt decreases to approximately 4.8° C. Thus, the ability of the sensors (34) to detect changes in temperature increase as the thickness of the silicon die (2001) decreases and the Δt gets more and more pronounced. Further, with an increase in Δt, a given sensor (34) is able to better distinguish between whether air (41) or a liquid (42) are juxtaposition to the sensor (34). As used in the present specification and in the appended claims, the term "approximately" or similar language is meant to be understood broadly as in connection with the above temperatures as the described temperatures plus or minus (±) 0.5° C.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the controller (230) of FIG. 3 or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Although examples of the fluid level sensor are described herein as being used or coupled to a reservoir or other container, the level of any volume of fluid may be measured suing the present systems and methods. For example, a volume of fluid that is open to an ambient environment as well as a fluid contained within an enclosed container may be used in connection with the examples of the fluid level sensor described herein.

The specification and figures describe a method of forming a fluid level sensor for a printable fluid reservoir and the corresponding structure. The method includes coupling an array of heating elements and sensors to a first side of a substrate. A second side of the substrate is coupled to a carrier. The method also includes coupling an electrical interface to the carrier and electrically coupling the array to the electrical interface via a conductive wire, the method further includes overmolding the electrical interface, the first side of the substrate, and the conductive wire to form an overmolded fluid level sensor.

The methods and systems described herein provide a low cost and high performance ink level sensor platform. The wire bond interconnects and sensor thin film layers are fully encapsulated in an EMC package to improve the reliability. The method further provides a fluid level sensor that is more economic to produce while providing superior fluid level sensing reliability and accuracy.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of forming a fluid level sensor comprising:
   coupling an array of heating elements and sensors to a first side of a substrate, wherein each heating element is independently actuatable to emit heat independent of other heating elements;
   coupling a second side of the substrate to a carrier;
   coupling an electrical interface to the carrier;
   thinning the substrate to no more than 100 micrometers in thickness;
   electrically coupling the array to the electrical interface via a conductive wire; and
   overmolding the electrical interface, the first side of the substrate, and the conductive wire to form an overmolded fluid level sensor.

2. The method of claim 1, wherein coupling the array of heating elements and the sensors to the first side of a substrate comprises:
   coupling the heating elements to the first side of a substrate; and
   coupling the sensors to the first side of the substrate juxtaposition to the heating elements.

3. The method of claim 1, wherein the overmold is an epoxy molding compound (EMC).

4. The method of claim 1, comprising coupling the overmolded fluid level sensor to a container, the overmolded fluid level sensor protruding into the container.

5. The method of claim 4, further comprising sealing the container with respect to an exterior of the container and the overmolded fluid level sensor.

6. The method of claim 1, wherein coupling the substrate and the electrical interface to the carrier comprises coupling the substrate and the electrical interface to the carrier via a releasable adhesive.

7. The method of claim 1, wherein the substrate comprises silicon.

8. The method of claim 1, comprising thinning the substrate to approximately 100 micrometers ($\mu m$) or less.

9. The method of claim 1, comprising removing the carrier, wherein removing the carrier comprises removing the carrier via a releasable adhesive used to couple the carrier to the second side of the substrate and the electrical interface.

10. A fluid level sensor comprising:
    a substrate, wherein the substrate is approximately 100 micrometers ($\mu m$) thick or less, wherein thinning the substrate increases performance of the sensors on the substrate;
    an array of heating elements and sensors coupled to a first side of the substrate;
    an electrical interface;
    a wire bond electronically coupling the array to the electrical interface; and
    an overmold, the overmold covering the electrical interface, the first side of the substrate, and the wire bond to form an overmolded fluid level sensor.

11. The fluid level sensor of claim 10, wherein the overmold is an epoxy molding compound (EMC).

12. The fluid sensor of claim 10, wherein the heating element emits a heat pulse for a duration of at least 10 microseconds with a power of at least 10 milliwatts.

13. The fluid sensor of claim 10, wherein the sensors comprise a diode with a characteristic temperature response.

14. The fluid sensor of claim 10, wherein the heater elements and sensors are interdigitated.

15. The fluid sensor of claim 10, wherein a heating element generates a pulse of heat which is sensed by multiple sensors of the array of heating elements and sensors.

16. The fluid sensor of claim 10, wherein the heating elements of the array of heating elements and sensors are individually addressable by a controller.

17. A printable fluid reservoir comprising:
    a fluid level sensor comprising:
    a substrate;
    an array of heating elements and sensors coupled to a first side of the substrate, wherein each heating element is independently actuatable to emit heat independent of other heating elements; and
    an overmold, the overmold covering the first side of the substrate to form an overmolded fluid level sensor; and
    a controller to independently actuate the heating elements.

18. The printable fluid reservoir of claim 17, comprising:
an electrical interface; and
a wire bond electronically coupling the array to the electrical interface,
wherein the overmold covers the electrical interface, the first side of the substrate, and the wire bond to form the overmolded fluid level sensor.

19. The printable fluid reservoir of claim 17, comprising:
a seal interposed between the overmolded fluid level sensor and the printable fluid reservoir to seal the printable fluid reservoir with respect to an exterior of the printable fluid reservoir and the overmolded fluid level sensor.

20. The fluid sensor of claim 17, wherein the controller retains a last level of liquid sensed by the sensor and the controller uses the last level of liquid sensed when determining which heating element to actuate.

* * * * *